April 18, 1961   R. M. SMYTH-DAVILA   2,980,187
HELICOPTER

Filed Feb. 28, 1957   6 Sheets-Sheet 1

Rodrigo M. Smyth-Davila
INVENTOR.

BY
Attorneys

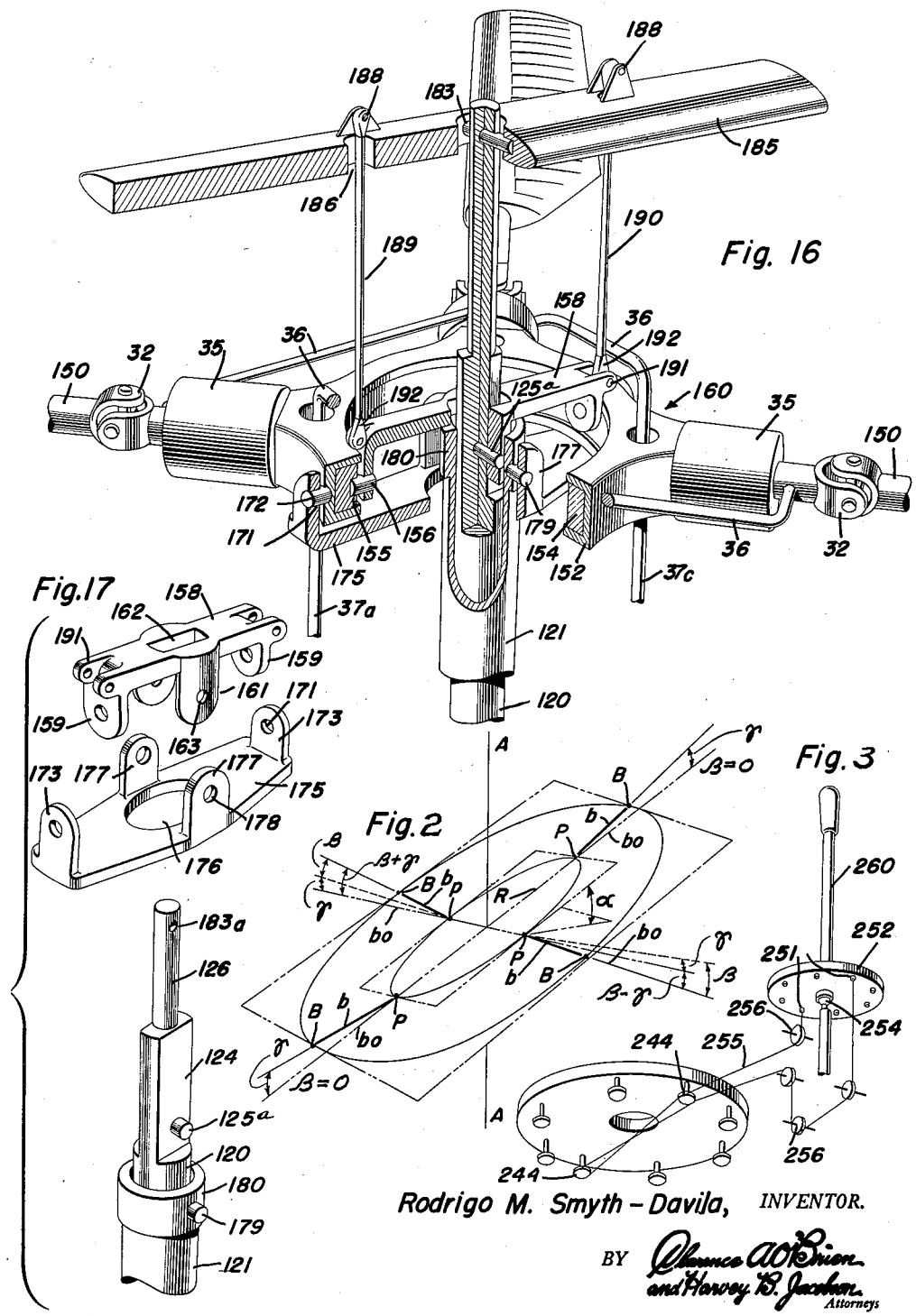

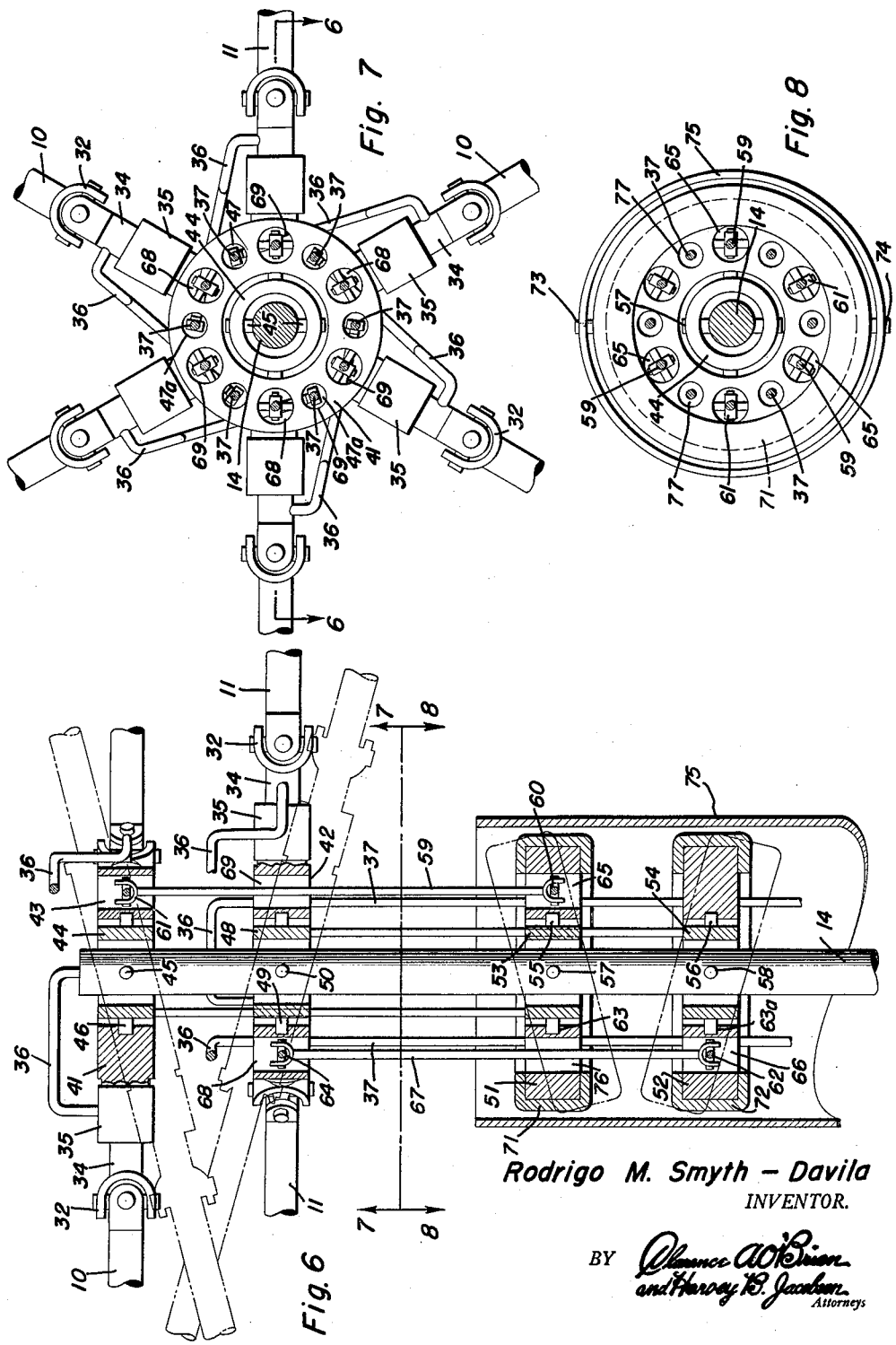

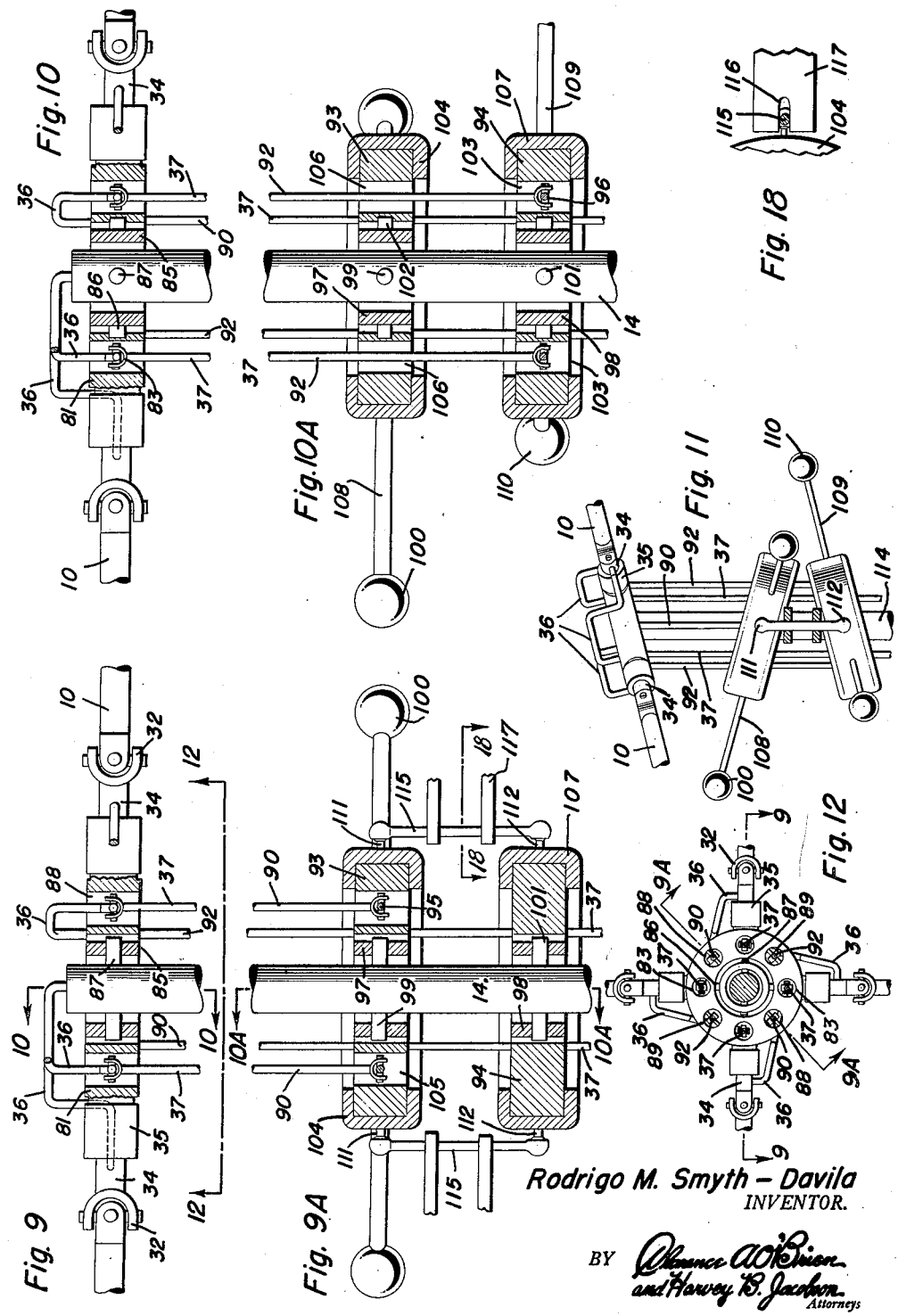

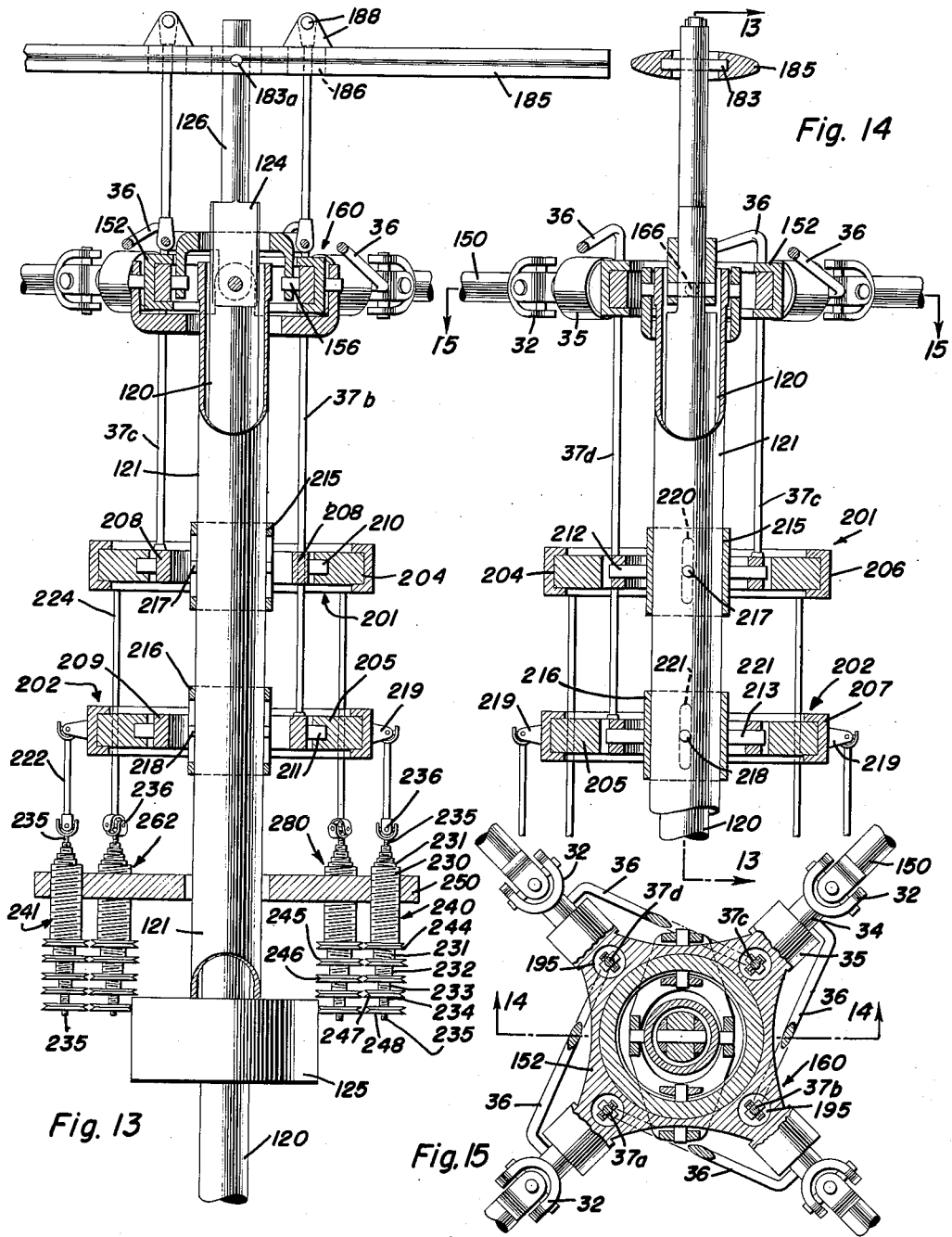

April 18, 1961   R. M. SMYTH-DAVILA   2,980,187
HELICOPTER
Filed Feb. 28, 1957   6 Sheets-Sheet 6
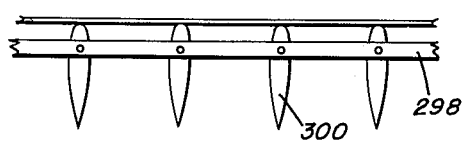
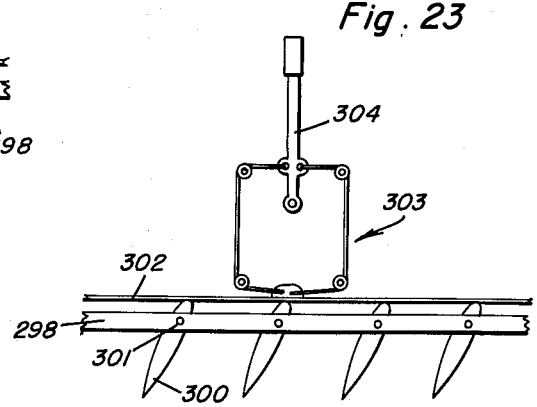
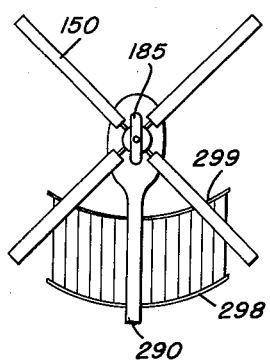
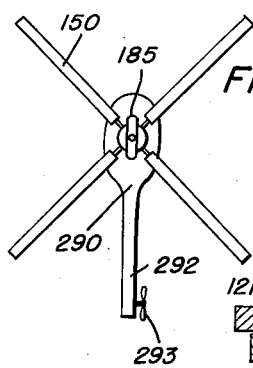
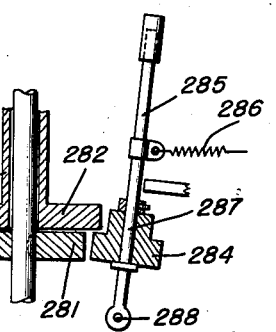
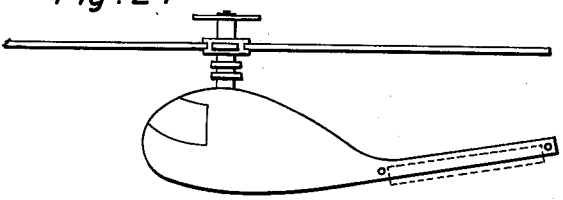
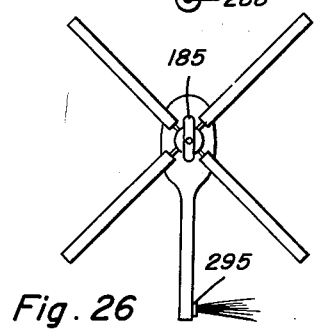
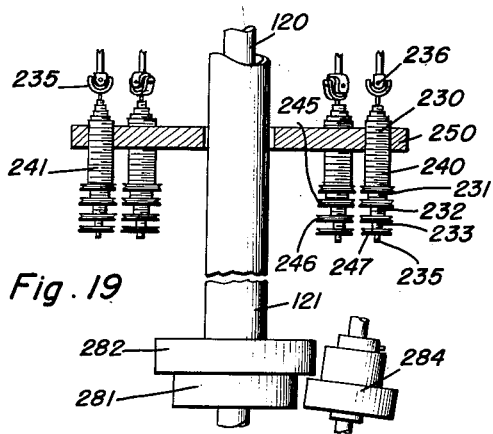
Rodrigo M. Smyth-Davila
INVENTOR.

United States Patent Office 2,980,187
Patented Apr. 18, 1961

2,980,187
HELICOPTER

Rodrigo M. Smyth-Davila, Apartado 769, San Jose, Costa Rica

Filed Feb. 28, 1957, Ser. No. 643,910

29 Claims. (Cl. 170—135.24)

This invention relates to rotary winged aircraft such as helicopters and it has for its main object to provide a drive and control system for helicopters in which a torque counteracting the reaction produced by the rotating wing structure is produced and is controlled by the pitch control system of the blades of the said wing structure, which is equipped with means for cyclically varying the pitch of the blades, said means, in cooperation with the drive means, producing a rotation of each blade around an axis inclined with respect to the axis of the shaft driving the rotating wing structure, and a variation of the inclination of said inclined axis.

The invention has been originally described in my earlier application, Serial No. 220,557, filed April 12, 1951, of which this application is a continuation-in-part.

The fuselage of a helicopter with one or more sets of wings rotating in the same direction will rotate around the axis of rotation of the wings in a direction opposite to the direction of rotation of the rotor in the absence of some counter-torque applied, on account of the fact that the driving of the wings produces a rotative reaction torque. To prevent such a reactive counter-rotational movement of the fuselage several methods have been suggested to produce forces or torques counteracting the reaction. These suggestions included the use of two wing structures which rotate in opposite directions or the use of tails with propellers, gas or air jets on the tail ends and other means. These means however consume power without adding to the buoyancy or speed of the helicopter.

The invention is based on a method according to which a flapping motion is imparted to the rotating blades, while the pitch of the blades is changed during rotation. If the angular position of the blades relatively to their plane of rotation changes during the rotation and if the angle of the blade has its maximum value during the phase of downward movement and decreases to a minimum or to zero during the phase of upward movement a torque will be produced which may be used for counterbalancing the reaction torque.

While the theoretical possibility of such a counterbalancing of the torque has been recognized no attempt has been made, to the knowledge of applicant, to translate this theory into actual practice, on account of the great difficulties experienced in connection with the construction of a suitable rotor adapted to perform the required motion in a regulated manner.

In addition the stresses on the blades reach extreme values so that it is difficult to construct blades having the required shape which can withstand the stresses.

The main object of the invention is to eliminate the disadvantages and difficulties connected with the above described method.

A principal object of the invention consists in providing means producing counterbalancing between the reaction torque and the anti-reaction torque by adjustment of the rotor of the helicopter relatively to the axis of the drive shaft of the rotor in response to the combined pitch adjustment of the blades.

A further principal object of the invention consists in producing a partial counterbalancing between the reaction torque and the anti-reaction torque by the above stated means, which part of the reaction torque is counterbalanced by conventional means, these means being however of such reduced size that they do not materially influence the buoyancy and speed of the helicopter while the constructional difficulties are eliminated or greatly reduced by this size reduction.

Further objects of the invention will be better understood, after a detailed explanation of the principle of the invention.

The invention is illustrated in the accompanying drawings showing several modifications of the invention by way of example. Various embodiments of the invention which have been illustrated are however shown in an essentially diagrammatic manner. These embodiments of the invention have been illustrated and described in order to explain the principle of the invention and several modes of applying said principle. It is however to be understood that it was not considered as being within the scope of the following specification and of the drawings to furnish a survey of the possible modifications of the invention embodying this principle and a departure from the examples shown and described is therefore not necessarily a departure from the principle of the invention.

In the drawings:

Figure 2 is a diagram illustrating schematically the flapping and coning angles of a blade pivoted to a hub during rotation, the blade being represented by a line;

Figure 3 is a diagram illustrating in perspective the manner of adjusting the swash plates;

Figure 6 is a sectional elevational view of a further embodiment of the invention, all parts being shown in a neutral position of rest while the operative positions are indicated in dotted lines, the section being taken along line 6—6 of Figure 7;

Figure 7 is a plan view of the embodiment of the invention shown in Figure 6, the section being taken along line 7—7 of Figure 6 when looking in the direction of the arrows 7—7;

Figure 8 is another plan view of the same embodiment of the invention partly in section, the section being taken along line 8—8 of Figure 6 looking down in the direction of the arrows 8—8;

Figure 9 is a sectional elevational view of the hub member of a further embodiment of the invention, the section being taken along line 9—9 of Figure 12;

Figure 9A is a sectional elevational view of the guide members for the hub member shown in Figure 9, the section being however taken along line 9A—9A of Figure 12;

Figure 10 is an elevational sectional view of the hub member of the embodiment of the invention shown in Figure 9, the section being taken along line 10—10 of Figure 9;

Figure 10A is a sectional elevational view of the guide members shown in Figure 9A, cooperating with the hub members shown in Figures 9 and 10, the section being taken along line 10A—10A of Figure 9A;

Figure 11 is an elevational side view of the same embodiment with the parts shown in operative position;

Figure 12 is a sectional plan view of the hub member shown in Figures 9 and 10, the section being taken along line 12—12 of Figure 9;

Figure 1:
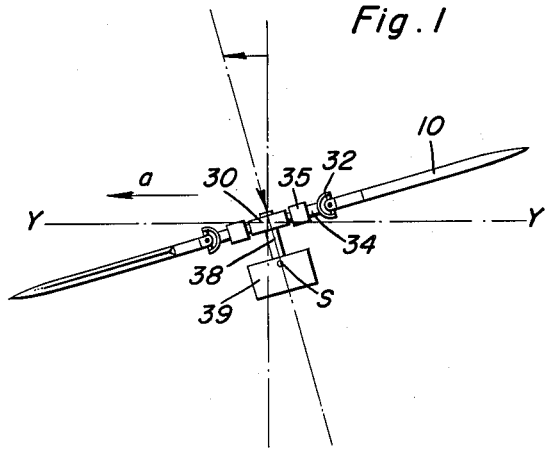
Figure 1 is a diagram illustrating in elevation the most elementary form of the invention which permits to obtain some of its advantages.

Figures 13-17 and 19-20 illustrate two embodiments of the invention which are identical except for the connection of the concentric inner and outer shafts by a drive gear. The identical parts of both embodiments being illustrated separately in Figures 14, 15, 16 and 17, while illustrated in conjunction with a gear connecting the concentric shafts in Figure 13. Among these figures Figure 13 is a sectional elevational view which illustrates, in addition to those parts which are identical in both modifications of the invention illustrated in Figures 13–17, the pitch control swash plates and part of their control mechanism.

This figure also illustrates the gear connection between the concentric shafts characteristic of one of the embodiments of the above mentioned invention. The section is taken along line 13—13 of Figure 14;

Figure 14 is a sectional elevational view showing that portion of the two embodiments of the invention which is identical, the section being taken along line 14—14 of Figure 15.

Figure 15 is a sectional plan view of the embodiment of the invention illustrated in Figure 14, the section being taken along line 15—15 of Figure 14;

Figure 16 is an isometric view of part of the embodiment of the invention illustrated in Figures 13, 14, 15 and 19 the said view also showing sections in planes at right angles to each other passing through the vertical axis;

Figure 17 is an exploded isometric view of some of the details shown in Figure 16;

Figure 18 is a sectional plan view of a detail, the section being taken along line 18—18 of Figure 9A;

Figure 19 is an elevational view of a portion of the second embodiment of the invention part of which is illustrated in Figures 14–17 and shows the portion which has been broken off in Figure 14. This figure therefore when taken in conjunction with Figure 14 is an elevational view of the second modification of the invention, in which the gear connecting the shafts is replaced by a starting device;

Figure 20 is a sectional elevational view of the starting device;

Figures 21–26 illustrate means for counteracting the reaction torque mechanically if only part of the reaction torque is counterbalanced by the anti-reaction torque produced by the blades and which is used in connection with the modification illustrated in Figure 19;

Figure 21 is a diagrammatic plan view of a helicopter provided with deflector foils for deflecting the downwash from the rotor;

Figures 22 and 23 are elevational side views of the deflector foils in different positions;

Figure 24 is a diagrammatic side view of a helicopter provided with the deflecting airfoils;

Figure 25 is a diagrammatic plan view of a helicopter provided with a tail propeller for counteracting the reaction torque;

Figure 26 is a diagrammatic plan view of a helicopter with an air or gas jet counteracting the reaction torque.

In order to explain the invention more fully the description of the embodiment of the invention may first be prefaced by a discussion of the forces acting on the blades. This discussion is based on actual tests and is therefore not to be considered as a purely conjectural discussion.

To avoid a confusing terminology reference may first be made to Figure 2 for the purpose of clearly defining the terms hereinafter used. In this figure the axis of rotation A—A is also the axis of the drive shaft and, as this axis is as a rule in a vertical position (although it is of course not vertical under all circumstances) a reference to the vertical in the specification and claims means a reference to this axis or to a line or plane parallel thereto. A reference to the horizontal likewise means a reference to a line or plane at right angles to this axis A—A. Also a reference to the plane or axis of rotation of a blade means a reference to the plane or axis of rotation at a point of the blade at the aerodynamic center of pressure, if not otherwise specified.

For the purpose of discussing the features of this invention two different types of flapping angles have to be considered. The flapping angle corresponding to the angle usually so designated is formed by the angle between the horizontal and the blades at those positions adopted by the blades during rotation which are angularly farthest apart from the horizontal. This angle which hereinafter will be referred to as the primary flapping angle is designated by alpha. In this definition it is assumed that the blades designated by $b$, are rigidly fixed to the hub, or that, if the blades are pivoted to the hub, no cyclic lift variations are being imposed on them.

A second type of flapping angle, which will hereinafter be designated as secondary flapping angle, occurs during rotation of a blade which is pivoted to the hub while the pivot is describing a circular motion, inclined with respect to the axis of rotation and cyclic lift variations are imposed on the blade.

The blade in this case in addition to its change of position with respect to the vertical, also changes its angular position relatively to the plane in which the pivot point P linking the hub and the blade moves. Otherwise expressed the blade $b$ also oscillates around the position $b_0$. The maximum angle between the blades $b$ and the inclined plane of rotation of P is designated as the secondary flapping angle $\beta$. In this case the angle between the inclined plane of rotation of P and the horizontal is the primary flapping angle.

Both the primary and the secondary flapping angles are to be added (algebraically) to the "coning angle" indicated at $\gamma$, which, as well known, is the angle to which the blades rise under static lift alone, the position to which the blades rise being the point in which the lift is in equilibrium with the transverse components of the centrifugal force effective upon them.

From the figure it will moreover be clear that any point, say at the aerodynamic center of pressure of a blade which is joined to the hub P—P by means of a universal joint when rotated by a shaft, the axis of which is indicated at A—A, always rotates in a plane, defined by the points B. As well known always a plurality of blades is attached to a hub to form a rotor and is driven by a driving shaft. One of the essential features of the present invention consists in means permitting each blade to rotate in a plane around an axis of rotation which is inclined relatively to the axis of rotation of the driving means and the angles of inclination of the planes of rotation of different blades may differ from each other. If an even number of blades is used which are symmetrically distributed, each pair of diametrically opposite blades may thus perform a rotation in a plane around an axis inclined toward the vertical at an angle which may differ from that of any other pair of blades. As will be seen from the following explanation it is this independent adjustability of the planes of rotation of the blades which is the largest single factor producing the full controllability of the system according to the invention, constituting a new principle of control of the helicopter.

A further point which may be mentioned in connection with the diagram Figure 2 consists in the control of those forces which act upon the blades and which, if left uncontrolled, would result in an unduly thick and heavy blade. These forces are connected with the above explained method of eliminating the reaction torque.

As already mentioned the method hereafter described of eliminating the reaction torque requires a cyclical change of the pitch or "bite" of the blades during rotation to produce corresponding lift variations, the secondary flapping angle being the result of this variation.

When a blade joined to the hub by a hinge flaps at the frequency of rotation around an axis intersecting the axis of rotation, a point on the blade, say the tip B, still moves in a plane although this plane is now a plane inclined to the axis of rotation. The stresses acting on the blades and also other conditions vary under such circumstances and are different from those originally acting on a blade rotating around the vertical axis.

While the blade by virtue of its inertia tends to maintain a uniform angular velocity about its inclined axis of rotation, its angular velocity around the shaft axis A—A will not be uniform. Due to the changing distance of each point of the blade from the vertical axis of rotation A—A the rotational speed varies twice during each revolution. The blade is therefore subjected to chordwise bending stresses which, however, with the flapping angles utilized, are of moderate magnitude.

The nature of the stresses to which the blade is subjected when cyclic lift variations are impressed upon it will depend on the nature of the connection of the blade with the hub or other supporting structure. A rigidly fixed blade is subject to high spanwise bending stresses which in large machines would entail the use of thick and heavy blades. Therefore it is preferable to hinge the blades at a distance from their inclined axes of rotation (R in Fig. 2). The mounting of the blades at a distance from the axis of rotation produces a secondary flapping angle, as above explained, which is superimposed on the primary flapping angle. The coupling between the blades and the hub is therefore produced by the centrifugal force engendered during rotation and the secondary flapping angle at any point is therefore directly proportional to the extent of the lift variations and inversely proportional to the centrifugal force acting on the blade and to the distance between the hinge and the axis of rotation. The phase of the secondary flapping component lags 90° behind the primary flapping component.

The primary flapping angle is determined exclusively by the cyclic pitch control system and its value is therefore determined by the magnitude of the anti-torque or forward propelling action about the vertical axis required and by the maximum lift variations which it is possible to impose on the blades.

The forward propeling action about the vertical axis and other related quantities can be estimated from the formulae given below in which the following symbols are used:

$Q'$=Forward propelling action about the vertical axis (lb. ft.)
$R'$=Radius at the spanwise aerodynamic center of pressure (ft.)
$L$=Maximum lift of each blade (lb.)
$L'$=Minimum lift of each blade (lb.)
$n$=Number of blades
$P$=Total power transmitted from the hub to the blades through their vertical components of motion (H.P.)
$P'$=Power spent by the blades in producing the forward propelling action about the vertical axis (H.P.)
$F$=Centrifugal force in pounds acting at the flapping hinge of each blade
$r$=Distance of the flapping hinge from the axis of rotation (ft.)
R.p.m.=Revolutions per minute of the hub and blades.
$\alpha$=Angle of inclination of the root path plane (flapping-hinge path plane) relatively to the drive shaft (primary flapping angle)
$\beta$=Angle of inclination of the tip path plane relatively to the root path plane (secondary flapping angle)
$\gamma$=Coning angle produced by average or static lift
$\delta$=Angle of inclination of the tip-path plane relatively to the drive shaft (total flapping angle)

$$Q' = \frac{R'n(L-L')\sin\alpha}{4}$$

$$P' = \frac{\pi R'n \sin\alpha(L-L')(\text{r.p.m.})}{66,000}$$

$$P = \frac{\pi rnF \sin\alpha \sin\beta (\text{r.p.m.})}{33,000}$$

Under stable conditions of operation P is obviously equal to P'.

Figure 4:
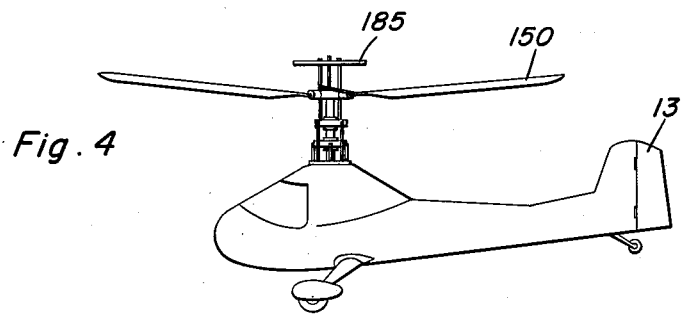
Figures 4 and 5 are elevational views of a helicopter in side and a front view, the helicopter showing a rotor system such as illustrated in Figures 13 to 17.
Figure 5:
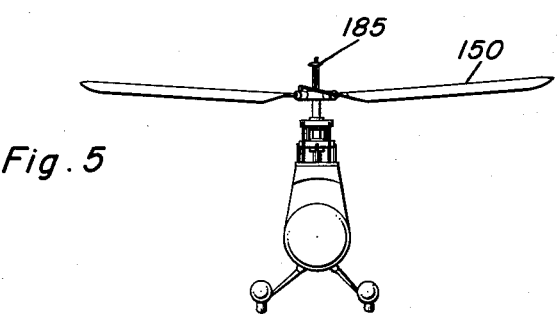

The lift variations generate spanwise variable bending stresses in the blades which cannot be completely eliminated. They are due to the unequal spanwise distribution of the aerodynamical forces acting on the blades in relation to the opposite centrifugal restoring forces. However, they are not of considerable magnitude and do not require any departure from the conventional design of the blades. A blade as designed for a conventional helicopter, may be considered to be suited for the system according to the invention when hovering. But when flying forward some of the stresses resulting from said two different causes will add themselves and would require a stronger and consequently heavier blade. If the blades cannot be reinforced it is nevertheless possible to use blades designed for conventional helicopters, if a rudder 13 is provided at the rear of the fuselage (Figure 4) which when the machine is moving forward is given the required angle of incidence by the pilot to gradually counteract the reaction of the rotor as the speed increases, while at the same time the anti-torque operation of the blades is gradually stopped, until the machine continues to fly as a conventional helicopter.

It should also be noted that the anti-reaction-torque action, even if power is transmitted uniformly, is derived from and dependent on the combined effect of the flapping and of the cyclic lift variations of the blades. Therefore this counteraction is not constant for each blade, but undergoes cyclic variations. It is a further object of the invention to produce such a uniform or approximately uniform anti-reaction-torque action, a result which, as described below, is obtained by using a plurality of blades flapping at different phases.

It has already been mentioned that the control of the anti-torque action of the system according to the invention in all of its modifications is performed entirely by the control of the pitch adjusting system of the blades. This pitch adjusting system on which the control of the helicopter centers is in itself known and usually comprises pivoted swash plates adapted for universal motion which rotate with the rotor blades and which are connected with the said rotor blades by connecting links acting on that portion of the blade which is rotatable within a combined thrust and radial bearing by means of which the blade is held on the rotating driven hub structure. The position of the connecting links and thereby the adjustment of the pitch of the blades is controlled by adjusting said swash plates.

The manner in which the pitch control arrangement performs the maneuvers which are necessary for flying the helicopter may be summarized as follows.

To turn the machine around a vertical axis two methods may be used. According to one method, the anti-torque action is increased to turn the machine in the same direction in which the blades rotate; to turn the machine in the opposite direction the anti-torque action is decreased.

To turn the machine around a vertical axis according to the second method, the cyclic pitch control system is adjusted so as to apply cyclic lift variations of equal magnitude to all the blades, said lift variations being in addition to and at an angle of 90° from those lift variations which are impressed on the blades to generate the anti-reaction-torque action. If it is desired to turn the machine in the direction of rotation of the blades the maximum increase in the lift of each blade should take place at the moment in which the position of the blade coincides with the highest side of the guide means used to transmit power to the blade, and the maximum reduction of lift should take place when said position coincides with the lowest side of said power transmitting guide means. To turn the machine in the opposite direction the phase of said lift variations is reversed. In either case the blades will tend to perform a precessional movement at points 90° apart from the points at which the maximum value of the lift variations takes place, or around an inclined axis perpendicular to the pivotal axis of the power transmitting guide means. The guide means obviously cannot rotate about said axis and the precession is thus resisted by the pivots of the guide means with the result that a precessional turning moment is applied to the guide means about said inclined axis perpendicular to its pivotal axis. Since the guide means are inclined with respect to the horizontal about said pivotal axis, a component of the above mentioned turning moment will attempt to rotate the guide means about a vertical axis. The other blades of the system which normally rotate in different planes will apply identical turning moments on the guide means, their respective components about the vertical axis all acting in the same direction, while their components about horizontal axes cancel each other. The guide means will thus be made to rotate around a vertical axis, and with it the whole machine, without affecting the horizontal attitude of the latter.

To move the machine in any horizontal direction, two different methods can be used. According to one method the rotor system as a whole is inclined, as is done in conventional helicopters, in the direction in which it is desired to move. The second method utilizes the fact that the blades are already rotating in planes inclined in different directions and consequently there is always a horizontal component of the lift in said directions. It is thus only necessary to increase the lift of those blades whose planes are inclined in the direction in which it is desired to move or which have a component in that direction, and to decrease the lift of the blades having a component in the opposite direction. This method has the advantage that there is no lag in the control, a driving force being applied to the machine in the desired direction as soon as the required controlling action is applied. The second method is especially useful for machines whose blades rotate in at least three different planes of rotation, such as a three bladed or a six bladed machine, having three pairs of opposite blades, since it is possible under these conditions to control the machine in every direction. In the case of a four bladed machine in which the blades rotate in only two planes inclined in opposite directions, this method is effective only in said two directions. For movements in other directions the first or conventional method must then be used.

The fact that the blades rotate in planes inclined in different directions provides the system with a high degree of inherent stability. This is due to the fact that the inclined planes offer a relatively high resistance to horizontal motion if the pitch of the blades has not been adjusted accordingly, since the effective angle of incidence, and consequently the lift decreases for the blades the planes of rotation of which are inclined in the direction of motion and increases for those the planes of rotation of which are inclined in the opposite direction. The result is a high resistance to horizontal motion that will damp effectively any incipient oscillation of the machine. If the pitch of the blades has been adjusted to produce horizontal motion as described in connection with the above mentioned second method, this stabilizing action will persist and manifest itself both in the direction of motion and in sidewise directions.

The system according to the invention is thus seen to be endowed with a high degree of controllability and stability both with respect to yawing and rolling, which greatly contributes to the safety and to the easy maneuverability of the flying machine; these qualities are lacking in present day helicopters.

As previously stated, any number of blades may be used in my rotor system, preferably an even number being used arranged in pairs of opposite blades symmetrically distributed around a hub. If two pairs of opposite blades are used, arranged at 90° from each other, each pair will rotate in its own plane, the plane of rotation of both pairs being inclined about a common axis but in opposite directions. This arrangement has the advantage that when flying at high forward speed said common axis of inclination, and consequently both planes of rotation, may be made to be parallel to the direction of flight, thus reducing the drag of the blades to a minimum value. This drag is substantially equal to the drag of the blades in a conventional helicopter.

To effect the various pitch controls required for the operation of the system, any suitable known method may be used. But since the blades rotate in different planes, as above explained, one independent pitch controlling unit must be provided for each different plane. In a four bladed machine having two pairs of opposite blades, each pair rotating in a common plane, two pitch controlling units should be used. In a six bladed machine having three pairs of opposite blades, three units are required. In a three bladed machine, since each blade would rotate in a different plane, three units would also be required.

Five different pitch controls are necessary for the operation of the system. These controls are the usual collective and cyclic pitch controls; the anti-reaction-torque cyclic pitch control; the turning cyclic pitch control and the differential pitch control.

In the modifications illustrated, so called swash plates, of more or less conventional design, are used as pitch controlling units. They are described in detail in connection with the modifications of the invention illustrated in Figures 13 to 17 and 19.

The usual collective pitch control is obtained by lowering or raising the various swash plates simultaneously for an equal distance, an operation which increases or decreases the pitch of all of the blades.

The usual cyclic pitch control is obtained by tilting the various swash plates through an equal angle in the same direction; this operation tilts the rotor as a whole in the desired direction.

The anti-torque cyclic pitch control is obtained by tilting the various swash plates also for an equal amount, but in different directions which depend on the direction of inclination of the plane of rotation of the blades whose pitch is controlled by each swash plate, with the result that the required cyclic lift variations are imposed on the blades without affecting the lift or the position of the rotor as a whole.

The turning cyclic pitch control is identical with the anti-reaction-torque control, but the direction in which the swash plates are tilted is so selected that the additional lift variations are applied to the blades at points 90° apart from those at which the anti-reaction-torque lift variations are applied.

The differential pitch control is obtained by raising or lowering the various swash plates differentially in such a manner that the pitch of those blades having a component of lift in the direction in which it is desired to move the machine is increased, while the pitch of those having a component in the opposite direction is decreased. This action produces a sidewise thrust in the desired direction without affecting the attitude or the total lift of the rotor.

Since the anti-torque and the turning cyclic pitch controls are identical, a single control lever may be used for both, but it is preferable to use one lever for each control so as to avoid any possible confusion.

The modifications of the invention which are described hereinafter have been illustrated either in a diagrammatic or in a semi-diagrammatic manner only and therefore all those details which are relative to the design have been omitted. For instance, all those details relating to the divisibility of the members permitting the mounting of parts within each other, the journalling of many parts and similar details of the design have been omitted.

The modification of the invention illustrated in Figure 1 shows a simplified structure still embodying the principle of the invention. This example merely comprises a rotor with a set of blades 10, linked by universal joints 32 to arms 34. The arms carry pitch adjusting thrust and radial bearings 35 carried by hub member 30. This hub member is driven by the shaft 38 and the engine 39, the entire structure being freely swingable around the point S. The blades are provided with pitch adjusting means, well known in themselves, and also illustrated in connection with other modifications of the invention.

The arrangement illustrated in Figure 1 is self-adjusting by virtue of its free movement around the point S which permits the adjustment of the plane of rotation of the blades in any position. However, as all the blades rotate in a common plane, inclined with respect to the vertical axis, a lateral component of the lift exists which moves the system constantly in the direction of the arrow $a$. The torque applied also has, in this case, a vertical component and therefore the reaction tilts the system around the horizontal axis $y$—$y$, the direction of the reaction torque produced depending on the direction of rotation of the rotor.

The above mentioned self-adjustment is due to the fact that the rotor will react as a gyroscope to any turning moment applied about the vertical axis to the stationary system. If the turning moment is in the same direction of the rotation of the blades, for instance, when the reaction torque diminishes, the rotor as a whole will precess, its plane of rotation tending to become parallel to the applied torque, i.e., horizontal, which action diminishes the angle of inclination of the plane of rotation of the blades, thus reducing their forward propelling action until the turning moment is counteracted. If the turning moment is in the opposite direction, for instance, when the reaction torque is increasing, the inclination of the plane of rotation of the blades will increase, thus increasing their forward propelling action until again the turning moment is counteracted.

This automatic reaction against any tendency of the stationary system to rotate in one direction or the other about the vertical axis is obviously present in all modifications of this invention, but the counteraction has been found in actual tests to be best in the modification shown in Figure 1; in the other modifications it must be supplemented by the pilot by adjusting the pitch control system. A system incorporating the full possibilities of the automatic counteraction of the other modifications is possible. In other words, this feature of the invention has been found to be fulfilled to a greater extent in the modification shown in Figure 1 and to a lesser extent in the other modifications.

If the cyclic lift variations of the blades are properly adjusted and phased by means of swash plates or like means well known in the art, all forces acting on the hub member are properly balanced and only a horizontal pivot at point S is necessary which allows a free tilting of the rotor around the said axis. The rotor is thus free to assume any inclination determined by the blades which are controlled by the cyclic pitch control system.

Figures 6, 7 and 8 illustrate a modification of the basic system in which, however, the planes in which the sets of blades rotate are made adjustable, the adjustment being effected by the pitch control. To provide a better sectional showing the figures illustrate the blade sets in a parallel position which is merely a position of rest, their actual position during operation in which the planes of rotation of the two sets of blades are inclined in opposite directions with respect to each other being shown in dotted lines.

The rotor comprises two sets of blades and each set comprises three blades 10 and 11 respectively. The number of blades used in each set is however immaterial. The blades 10 and 11 are attached to the arms 34 by universal joints 32, and the arms are again held in combined thrust and radical pitch adjusting bearings 35. Said bearings are a part of or are carried by hub members 41 and 42 respectively, each provided with a number of bores or holes 47, 47a for a purpose explained below. The hub member 41 is carried by the drive shaft 14 by means of a gimbal ring 44, attached to the drive shaft by means of swivel pins or trunnions 45. The gimbal ring carries the pivot pins 46 which enter suitable bearing recesses on the hub member 41. Likewise the hub member 42 is carried by shaft 14 by means of a gimbal ring 48 which is suspended on and driven by the shaft 14 by means of trunnions 50 and which carries the pivot pins 49 entering suitable recesses of member 42. It will therefore be clear that the hub members 41, 42 are suspended on the shaft 14 in such a manner that universal movement in all directions is possible, while simultaneously the shaft 14 is capable of driving the said hub members.

For adjusting the pitch of the blades the usual pitch control arms 36 and pitch control rods or links 37 are used, each of said rods or links being joined to an arm 36 by a universal joint. The universal joints for the arms 36 adjusting blades 10 are located in bores of member 41 aligned with bores 47 in Figure 7, while those for the arms 36 adjusting blades 11 are located in bores 47a of hub member 42. Moreover the latter member is provided with bores 47 for the passage of the rods or links 37. These rods or links after passing through one of the bores 47 of the hub member 42 are connected with a swash plate operated by the pilot which is not shown in this figure and which serves to adjust the pitch of the blade and to impart the cyclic pitch variations to the blades.

The characteristic feature of the modification illustrated in Figures 6 to 8 consists in the adjustment of the hubs. In order to permit the adjustment of the position of the hub members 41, 42, guided disks 51, 52 respectively are provided which are seated on the shaft 14 by means of swivel or gimbal rings 53, 54 which are held on the shaft by means of pivot pins 57, 58. The rings carry trunnions 55, 56 held in bearing recesses 63, 63a respectively of the guided disks 51, 52 respectively. The guided disk 51 is provided with bores or holes 65 in which the heads 60 of the steering rods 59 are held for universal or all around movement. The guided disk 51 is shown as being provided with three such steering rods 59 the upper ends of which are connected with hub member 41 by means of heads 61 which are mounted for universal movement in the bores 43 of the hub member 41. Likewise steering rods 67, three in number in the example shown, connect the guided disk 52 with the hub member 42 the heads 62 and 64 of the steering rods 67 being mounted for universal motion within the bores 66 of the guided disk 52 and within bore 68 of hub member 42 respectively. Obviously, the position of the guide members is always parallel to that of their respective hubs.

The guided disk 51 is in addition provided with bores 76 for the passage of rods 67 and both guided disks 51 and 52 are in addition provided with bores 77 for the passage of the pitch adjusting rods or links 37.

The guided disks 51 and 52 are held in annular guiding frame members 71, 72 which form a guide for the rotating cam disks during their rotation. The annular guide frames are U-shaped in cross section and they are pivoted by means of pivot pins 73, 74 to an outer stationary cylindrical member 75. The pivots 73, 74 are aligned with pivots 57, 58 respectively and are therefore not shown in Figure 6. When the hub members 41, 42 are tilted around the axis parallel to 73, 74, the guided disks which are driven by the shaft 14 are also tilted around 73, 74 while driven and therefore rotate in a definite plane, by virtue of their connection with the hub members 41, 42 by means of the steering rods 59, 67.

The primary function of the guided disks in cooperation with the guide frames 71 and 72 is the conversion of the rotary motion about the vertical axis of the drive shaft into rotary motion about inclined axis which, as explained below, serves to apply the required power to the blades through their reciprocating vertical components of movement, or, in other words, through their flapping movements, without normally applying to them a torque about the vertical axis.

It has been mentioned that the two hub members must be inclined with respect to the vertical in different directions but at the same angle, this angle being however adjustable. The adjustment may be performed by means of a device which is not shown in this figure but which is essentially similar to or identical with the device shown and described below with reference to Figure 3.

A reaction torque is created by the engine in applying its power to the drive shaft, which reaction torque acts on the stationary system, but since the guide means transforms the total torque applied by the drive shaft into vertical reciprocating forces which are applied to the hub and then to the blades through their flapping motions, without applying any torque to the blades about the vertical axis, while at the same time the guide means are linked to the stationary system either directly (as in the modifications illustrated in Figures 6 to 12 of application) or through the shaft 121 and gear 125 and corresponding bearings (as in the modification illustrated in Figures 13 to 17) the result is that the direct torque applied by the drive shaft on the guide means and the above mentioned reaction torque created by the engine which acts on the stationary system, counteract each other through the above mentioned linking means, wherefore there is no tendency of the stationary system as a whole to rotate about the vertical axis in opposition to the blades.

Obviously, said counteraction will be complete only when the anti-reaction system is properly adjusted. If the forward propelling action of the blades is incomplete, the deficiency of propelling force must be supplied by the hub as a direct torque about the vertical axis and a reaction torque proportional to said deficiency will act upon the stationary system tending to rotate same in the opposite direction of the blades. On the other hand, if the forward propelling action exceeds the drag of the blades, the excess of propulsive force will be applied by the blades to the hub in the same direction of its rotation, and consequently applying a torque about the vertical axis on the machine as a whole, tending to rotate said machine in the same direction as that in which the hub and blades move. The previously mentioned balancing of all of the forces acting on the hub members which endows the rotor with complete freedom to tilt about the horizontal pivotal axis in response to the pitch control, at the same time that power is transmitetd by the hub member to the blades through their flapping or vertical components of motion, is a feature which is common to all modifications of the invention and is produced as more fully explained below. Reference is made to Figure 2. If the lift on each blade is kept at a constant or normal value through out its rotation, it is apparent that all forces acting on the rotor will be balanced about the horizontal pivotal axis about which the plane of rotation of the blades is inclined.

If lift variations are imposed on the blades to produce a forward propelling action according to the invention, the lift of each blade should have normal value when the point of attachment of the blade to the hub (i.e. at hinge 32), the root of the blade, is at its highest position, increasing as the blade moves downward, and reaches its maximum value at a point midway between the highest and lowest positions, decreasing thereafter until the root of the blade is at its lowest position at which the lift becomes again normal. From then on as the blade moves upward in its inclined plane of rotation the lift decreases below normal, reaching its minimum value when the root of the blade is at a point midway between the lowest and highest positions, increasing thereafter until when the root of the blade returns to its highest position at which the lift again becomes normal. Since the lift of all the blades experiences identical variations and acquires the same values exactly at the same points during their rotation, a constant turning moment is created, acting on the hub about an inclined axis perpendicular to the pivot axis about which the hub is tilted, passing through the axis of rotation of the hub and through the highest and lowest points on the circular path described by the root of the blade. If the rotation of the blades is clockwise, looking upward along their axes of rotation, the turning moment will be clockwise looking upward along the inclined axis about which the turning moment takes place.

Obviously, the turning moment created by each blade has a variable magnitude, varying from zero when the blade root is at its highest or lowest position, to a maximum when the blade root is in its immediate position. But since the lift variations take place in a substantially sinusoidal manner and three or more blades are used, equidistant from each other, the sum of the turning moments of all of the blades at any given moment, whatever the rotational position of the blades, is always constant. The forces acting on any point of the hub located on either side of the pivotal axis are of equal magnitude and direction as the forces acting on a corresponding point equidistant from the pivotal axis and located directly opposite to the other side of the pivotal axis, with the result that all forces are balanced and concentrate on the pivot axis, whereby, as stated above, the hub and consequently the entire rotor, will have complete freedom to tilt about the pivotal axis in response to the action of the pitch control system.

What has been said with respect to the balancing of the forces acting on the hub resulting from the lift variations imposed on the blades and consequently from the transmision of power from the hub to the blades, may be said with respect to the reaction forces acting on the guiding frame members 71, 72 of the modification illustrated in Figures 6-8, and on the guiding frame members 104, 107 of the modification illustrated in Figures 9, 9A, 10, 10A, since said reaction forces result from the application of power from the guide means to the respective hubs through the steering rods 59, 67 or 90, 92, respectively, the forces transmitted by these steering rods being those required to move the blades against the lift variations in order to transmit power to the blades through their flapping or vertical components of motion, as more fully explained below.

During rotation of a guided member within its guiding frame, the forces applied by the guided member on each steering rod, experience sinusoidal variations between zero and maximum value (zero when the rod is at its highest position, maximum downward force when the rod is moving downwards midway between the highest and lowest positions, and zero again when the rod is at its lowest position, maximum upward force when the rod is moving upward midway between the lowest position and highest position, and zero when the rod reaches again its highest position). The corresponding reactions produce a turning moment acting on the respective guiding frame and passing through the highest and lowest points of said guiding frame on the central plane of the same.

The reaction force acting on any point of the guiding frame located on either side of the pivotal axis is of equal magnitude and direction to the reaction force acting on a corresponding point equidistant from the pivotal axis and located directly opposite on the other side of said pivotal axis, with the result that all forces are balanced about and concentrate on said pivotal axis, whereby the guiding frames will have complete freedom to tilt about said vertical pivotal axis and will thus freely follow any tilting motion of the hub, while at the same time power is transmitted from the guide means to the hub.

This freedom of the hubs and corresponding guide means to tilt about their respective pivotal axes enables the blades to control, through the action of the anti-reaction torque cyclic pitch control system, the angles of inclination of their planes of rotation as well as that of their respective hubs and guide means, thereby controlling the amount of power that is transmitted to them through their flapping or vertical components of motion, and consequently also controlling the magnitude of the forward propelling or anti-reaction torque action produced.

Since the two hubs and respective guide means of the modification illustrated in Figures 6-8, are tilted in opposite directions about parallel pivot axes, while all the blades rotate in the same direction it is obvious that the turning moments acting on the upper and lower guide frames are in opposite directions and counteract each other through the stationary means linking their respective pivots.

A further modification embodying the basic principle explained above is shown in Figures 9 to 12. The principle of using two different sets of blades, each rotating in a plane which is inclined towards the vertical in a direction which differs from that in which the plane of rotation of the other set of blades in inclined towards the vertical, is replaced by the principle of using as a rotor a single set of blades (four in the example illustrated in Figures 9 to 12), each blade or each pair of blades rotating in its own plane so that a "wobbling" motion of the hub results during which the hub member oscillates between two planes which are inclined towards the vertical, the angle of inclination of the two planes being equal, but the direction of the inclination being the opposite one with respect to the vertical in the two planes.

The members of the arrangement are shown in a position of rest in Figures 9, 9A, 10 and 10A to permit clearer illustration while the position of the members in actual operation is indicated in Figure 11. The hub and guide members shown in Figures 9 and 9A and Figures 10 and 10A cooperate, but are shown in sections corresponding to different planes.

The blades 10 (Figures 9 and 10) are again joined to arms 34 by universal points 32 permitting a secondary flapping and also a lagging of the blades. The arms 34 are held in combined thrust and radial bearing 35 attached to a hub member 81 on which the blade arms are mounted, said bearings permitting pitch adjustment of the blades. The arms 34 are connected with the pitch adjustment arms 36 which are hinged to the pitch adjusting rods or links 37 in a manner which is well known and which has already been described in connection with the other modifications.

The hub member 81 is supported on and driven by a shaft 14 by means of a gimbal ring 85 provided with trunnions 86 (Figure 10) which are held in recessed bearing portions of the hub member. The gimbal ring is supported on trunnions 87 projecting from the drive shaft 14. The hub member 81 is thus mounted for universal controlled motion on the shaft, while being driven by the same. The hub member 81 is provided with axial bores 88 and 89, arranged in pairs, the two bores 88 of one pair being located on the hub on diametrically opposite sides with respect to the axis of rotation. The pair 89 is similarly located. The two bores 88 receive the forked heads of steering rods 90 which are mounted within said bores for universal motion around a point. Likewise the forked head of connecting or steering rods 92 are mounted within the bores 89, the connection between the heads and the hub member 81 being again made by means of suitable universal joints permitting universal or all-round movement of the head around a point located in the horizontal plane passing through the center of the trunnions 87.

The lower ends of each pair of rods 90 and 92 respectively are held in the cams 93, 94 respectively by means of the forked heads 95, 96 which are similar to those arranged at the upper ends.

Each guided member 93, 94 is mounted on the shaft 14 by means of a gimbal ring 97, 98, carried by the swivel pins 99, 101 respectively, projecting from the shaft 14. The gimbal ring 97 supports the guide member 93 by means of the pins 102 entering suitable recesses in the guided member 93. The guide member, in its turn, is rotatably held within an annular guide frame 104, the annular portion of which is U-shaped in cross section. The marginal portion of the guided member is embedded within the U-shaped annular portion. The frame member is weighted by means of weights 100 held at the end of levers 108 attached to and projecting from the guide frames 104 for a purpose to be explained below.

The guided member 93 is moreover provided with at least four axial bores or holes 105 and 106, two bores 105 being used for fixing the forked heads of the steering rods 90 for universal motion around a fixed point located in a plane passing through the axis of the swivel pins 99. Two further bores 106 serve for the passage of the steering rods 92 the heads 96 of which are fixed within the bores 103 of guided member 94. The said guided member is otherwise arranged and held in a manner similar to that described in connection with guided member 93. It is however only provided with two bores 103. In addition to the bores mentioned the two guided members are also provided with bores 83 for the passage of the pitch controlling rods or links 37. The guided member 94 is held within a guiding frame 107 equipped with weights 110 carried on arms 109 projecting from the guiding frame. These two guiding frames 104 and 107 may be connected with each other, as indicated in Figures 9A and 11. The connection preferably comprises pins 111, 112 with ball shaped heads held in ball shaped recesses provided in the heads of connecting bars 115. The bars are held against rotation by stationary parts so that the two annular ring structures 104 and 107 cannot rotate. A simple way of holding the connecting bars 115 consists, as shown in Figure 18 in arranging them in such a way that they pass through slots 116 of a stationary part 117.

In operation guided member 93 will assume a position parallel to the plane of rotation described by the diameter joining the two points on the hub member 81 to which the steering rods 90 are attached, while cam guided member 94 will assume a position parallel to the plane of rotation described by the diameter joining the two points on the hub member to which the steering rods 92 are attached.

If through the adjustment of the pitch control system the blades 10 are made to rotate in planes inclined in different directions, the hub member as previously explained will perform a wobbling motion in the direction of its rotation and at a frequency double to that of said rotation. As a result of said wobbling motion any two diameters of the hub member perpendicular to each other passing through the central plane of said hub member will rotate in planes inclined in opposite directions. Consequently, since the two diameters on the hub member 81 joining the two pairs of points to which the two pairs of rods 90 and 92 are attached are perpendicular to each other, said two diameters will rotate in planes inclined in opposite directions and the two guided members 93 and 94 joined to the hub member by said steering rods will thus be tilted in opposite directions and will maintain such position until the pilot changes the cyclic pitch adjustment of the blades. The two guided members 93 and 94 will thus be adjusted by the pitch control effected by the pilot, one of the methods of adjustment being shown in connection with the modification illustrated in Figures 13 to 17 and in Figure 3.

If the different movements of the blades are adjusted in a suitable manner, in accordance with the principles above described, their reaction producing tilting will neutralize or cancel each other completely. Also, the tilting couples produced when two hubs are used, by the opposite horizontal lift components may cancel each other as now said lift components act in opposite directions about the same point on the axis of rotation.

During rotation of guided members 93, 94 within the guide frames 104, 107 respectively, which are at a given tilting angle towards the vertical, a variable downward force is applied on one side and a variable upwardly directed force is applied on the other side of each guided member when power in the form of reciprocating impulses is transmitted through the steering rods 90 and 92 to the blades by means of the guided members. A reaction in the form of a variable turning moment is thus produced acting on each of the guiding frames in a constant mean direction about an axis perpendicular to the pivotal axis but undergoing cyclic variations in magnitude from zero to a maximum value, its mean direction being opposite to the mean direction of the corresponding variable turning moment acting on the other guiding frame as a result of the fact that both guiding frames are tilting in opposite directions. The integration of the variable reaction forces producing the turning moment acting on one guiding frame is equal to the integration of the opposite variable reaction forces producing the opposite turning moment acting on the other guiding frame, and since the two guiding frames are linked through the connecting bars 115, the two opposite turning moments will completely counteract each other so that no continuous tilting motion of either guiding frame will be produced about an axis perpendicular to the respective pivotal axis. But since the two pairs of steering rods 90 and 92, through which power is transmitted from the guided members 93 and 94 to the hub 81, do not act simultaneously, the phase of the cyclic variations of the reaction forces acting on one guiding frame will not be exactly opposite to the phase of the cyclic variations of the reaction forces acting on the other guiding frame, with the result that at a given moment the turning moment acting in one direction on one guiding frame predominates, while an instant later the opposite turning moment acting in the opposite direction on the other guiding frame predominates, giving rise to an oscillatory movement of the guiding frames, and as this cycle is repeated every half revolution of the steering rods, the frequency of the oscillatory movements is twice the frequency of rotation.

It is apparent that the integration of the reaction forces acting on any point of each guiding frame located on either side of the pivotal axis is of equal magnitude and direction to the integration of the reaction forces acting on a corresponding point of the same guiding frame equidistant from the pivotal axis and located directly opposite on the other side of said pivotal axis, with the result that all forces are balanced about and concentrate on the pivotal axis, whereby no continuous tilting motion will be produced about said pivotal axis; but since the forces do not act simultaneously at either side of the pivotal axis an oscillatory movement results about said pivotal axis having a frequency double the frequency of rotation of the steering rods 90 and 92.

Since the guiding frames are stationary it is possible to reduce the amplitude of the oscillatory movement of the guiding means by increasing the stationary mass, the said increase being preferably produced by attaching a number of weights 100 to the stationary guiding frame 104, the weights being preferably held on lever arms 108 of sufficient length. Similar weights 110 are attached to the guiding frame 107 and are held on levers 109. The moment of the weights thus reduces the amplitude of the aforesaid oscillatory movements.

As mentioned above, no continuous tilting motion of the guiding frames results from the action of the variable turning moments since the resultant reaction forces acting on the guiding frames are alternating, whereby the guiding frames remain entirely free to tilt about their pivotal axis, in the same manner as the guiding frames of the modifications shown in Figures 6-8, their respective angles of tilt being controlled by the respective hubs through the steering rods, while at the same time power is transmitted from the guide means to the hub through said steering rods.

In the case of the modification of Figures 9, 9A, since the hub is subjected to a wobbling motion, the inclination of each guiding frame is controlled by the inclination of the plane of rotation of the pair of diametrically opposite points of the hub to which the respective pair of steering rods 90 or 92 is attached.

It will be clear that the possibility of transmitting power from a guide means to its respective hub while retaining the freedom of both to tilt about their respective pivotal axes is brought about by the fact that the power impulses are transmitted in the form of couples acting on the hub and reacting on the guide means about axes which are perpendicular to the respective axes about which their tilting motions take place and about which said power impulses are completely balanced, so that the small couples required to produce the tilting motions are not affected by the much stronger power impulses. The above applies equally well to all modifications of this invention.

A further construction embodying the principles of the invention is shown by way of example in Figures 4, 5 and 13 to 17 and 19. While this construction is partly shown in detail it may again be emphasized that the showing is still diagrammatic in many ways and that it does not include all the details which are necessary for a complete working design. More specifically all those details for example which relate to the mounting of the parts within each other to the mounting of the structure on the helicopter and similar details have been omitted in order not to obscure the showing of the essential parts.

Two embodiments of the invention very nearly identical with respect to construction and differing only in one point are illustrated in Figures 13 to 17 and 19. Both embodiments of the invention are characterized by the use of two concentric shafts 120 and 121, the latter being tubular and surrounding the former. The two embodiments however differ with respect to the connection of the shafts.

In one of the modifications of the invention the two shafts are connected by a gear and as will be explained this gear permits to balance the reaction torque completely. It is however also possible with the same general arrangement, but by eliminating the gear connecting the shaft and by transmitting the driving power at twice the speed of the rotor to produce a forward propelling action of the blades of the rotor which merely reduces the total reaction torque, such reduction amounting to 50%. For many reasons explained below this in itself is a highly desirable result, as the taking up of a reduced reaction torque requires only means which do not unduly add to the weight and to the complication.

In Figures 14 to 17 the construction shown applies to both embodiments of the invention above mentioned and Figure 13 likewise shows a construction, the upper portion of which applies to both embodiments of the invention. Only at the lower end the gear 125 connecting the shafts is used solely in connection with the embodiment of the invention in which the reaction torque is completely counteracted by the forward propelling action of the blades.

In this last named modification the gear may be of any known type, planetary or otherwise and it produces a definite ratio between the angular rotational speed of the shafts. In the example shown it is assumed that the ratio is 2:1, the inner shaft 120 rotating in the same direction at a speed which is twice the rotational speed of shaft 121.

As seen in Figure 17 the inner shaft 120 projects beyond the outer tubular shaft 121 at the upper end and this end has a flattened portion 124 from which trunnions 125a project. The end of the shaft is formed by a cylindrical section 126 of reduced size, the diameter of which is not larger than the distance between the flattened portions.

As seen in Figures 13 to 17 a set of blades 150 (four blades being shown in the figures) are again joined by universal joints 32 and pitch adjusting combined thrust and radial bearings 35 to a hub member generally indicated at 160. The hub member 160 is a combined structure including an annular outer hub member in the shape of a frame 152 with outwardly projecting bosses which carry the thrust bearings 35, the annular portion of which is U-shaped in cross section. The U-shaped portion houses and is guided by the inner hub member 154 which is provided with bearing recesses 155 receiving pivot pins or trunnions 156 the axis of which is arranged in a horizontal plane perpendicular to the axis of rotation of the shafts 120, 121. The inner hub member, as will be understood performs the function which was performed by the guide members 104, 107 in Figure 9 or 71 and 72 in Figure 6 respectively. The trunnions 156 are carried by a transverse trunnion support 158 (shown in detail in Figure 17) which has two downwardly reaching end portions 159 carrying the trunnions in suitable bores and two central and lateral downwardly turned lugs 161 which are cylindrical on the outside and flat on the inside and which hug the flat portion 124 of shaft 120. Bores 163 on said lugs 161 serve as bearings for the trunnions 125a, projecting from the flattened portions of the shaft 124. The transverse or bridge piece of the transverse trunnion support 158 is provided with an elongated hole 162 in the center for the passage of the said flat shaft portion 124. It will be noted that the axes of the trunnions 156 and 125a are at right angles to each other.

The frame member 152 carries swivel pins or trunnions 172 which are journaled in recesses of a second elongated transverse member 175 which is provided with a central circular opening 176 and with upstanding end lugs 173. These end lugs are provided with recesses 171 for the reception of the trunnions 172 and with lateral upstanding ears 177 provided with recesses 178 for the reception of the trunnions 179 which project from a collar 180 of the outer shaft 121.

For reasons which will be explained it is necessary to prevent the inner hub member from tilting around trunnions 125a leaving the same free to tilt around the axis at right angles thereto. In order to obtain this result the swivel connection between the transverse member and the shaft may be eliminated and the transverse member may be directly fixed to the shaft. However, a fixed connection would produce major disadvantages some of which are explained below and therefore another means has to be used.

When the inner hub member rotates and transmits power to the blades while being kept at a constant tilting angle with respect to the axis of rotation a downwardly directed force is applied on one side and an upwardly directed force is applied on the other side of the guided frame member 152. The reaction which is produced and which is acting on the inner hub member has a tendency to produce a movement around the axis of the trunnion 125a. Since said inner hub member rotates, if trunnions 125a were eliminated and the transverse trunnion support were fixed to the shaft, the result would be a vibration with a frequency equal to the number of revolutions of the inner hub member around its axis. It is therefore preferable to counteract said reaction in another way in order to avoid vibration of the shaft and of other parts of the system.

In order to counteract the reaction a rotating streamlined vane 185 is used, the mass of which is preferably concentrated in the tips and which is pivoted, by means of pivots 183 held in recesses 183a of the extended shaft section 126 on top of the flat section 124. The pivots 183 enter suitable recesses in the vane permitting a tilting of the same. The vane 185 is provided with bores 186 and carries on its upper side small cheek plates holding a bolt or axle 188 which serves as a pivot point for the link members 190, 189 passing through the said bores. These link members are pivotally connected with the transverse trunnion support 158 a pair of small lugs being provided at each end in order to hold the pivot 191 for the lower ends 192 of the said link members 189, 190.

The pivots and links are all arranged substantially in a vertical plane passing through the axis of rotation and also passing through the axis of trunnions 156. When the trunnion support is therefore tilted relatively to the shaft 120 the vane 185 tilts with it and both members 158 and 185, as well as the link members, remain substantially parallel.

The reaction absorbing vane 185 is held in its position by virtue of the centrifugal force acting on it which has a tendency to keep the vane in a position which is perpendicular to the axis of the shaft 120. It is to be noted that the vane 185 is driven by shaft 120 and rotates at a speed which is twice the speed of the blades and that the restoring moment produced by the centrifugal action is therefore sufficiently large to counteract the constant moment which causes the above described tilting of the hub member 154. The vane 185 is tilted through a small angle only, the extent of said tilting being just sufficient to counterbalance the moment producing the tilting. With it the inner hub member and the member 158 will be tilted through the same angle.

The vane 185, as will be noted, will not exercise any counteraction when the rotor as a whole is tilted in any direction, as for instance during the application of the conventional cyclic pitch control. The lack of a counteraction is due to the fact that when the plane of rotation of the vane is tilted, the vane will no longer be rotating about the drive shaft axis; the vane will then be rotating about its own inclined axis and the centrifugal force will act radially, that is, along the longitudinal axis of the vane, and obviously will not restrain the motion producing tilting since said centrifugal force will change its direction continuously as long as the tilting of the plane of rotation of the vane continues, and will always be radial relative to said plane of rotation, that is, along the longitudinal axis of the vane. The gyroscopic resistance of the vane does not produce any restraining action either, since the vane is not free to precess in any direction and consequently will freely follow any tilting movement of the hub.

There exists however, a small force restraining the tilting of the plane of rotation of the vane, which is derived from the resistance of the air to the rotation of the vane. To overcome the air resistance the drive shaft has to apply a torque to the vane, which torque is necessarily about the drive shaft axis. A precessional force is thus created tending to shift the plane of rotation of the vane to parallelism with the applied torque, i.e., to return the plane to its neutral position, perpendicular to the drive shaft axis. Said precessional force is proportional to the air resistance, which is small because of the streamline shape and small size of the vane, and to the sine of the angle of tilt of the vane, which is also small, with the result that the said precessional force is almost negligible and may be ignored, its small restraining action being easily overcome by the aerodynamic force created by the blades through the action of the pitch control, and which are producing the tilting of the rotor.

On the other hand, when the inner hub member transmits power to the blades, the vane 185, as previously explained, will be tilted at a constant angle with respect to the drive shaft 120 about a horizontal axis, which axis rotates with the drive shaft. In other words, in said tilted position centrifugal force will obviously tend to urge the vane to a position perpendicular to the drive shaft thus counteracting the turning moment which acts on the hub, when power is applied to the blades.

Vane 185 may be compared to a two-bladed see-saw mounted rigid rotor as that of a "Bell" helicopter, the plane of rotation of which is tilted whenever required through the action of the cyclic pitch control, the only restoring force being that produced by the torque applied to overcome air resistance, as explained in connection with vane 185. And in the case of the seesaw mounted rigid rotor air resistance is relatively large because the blades have to produce lift.

In the modification illustrated in Figures 13 to 17 a single guiding hub member 154 is used rotating at a speed which is twice the speed of the blades. The inner guiding hub member 154 by virtue of the "wobbling" motion imparted to the hub member 160 and the guide frame member 152 converts the rotary motion of the vertical shaft 120 into a rotary motion about inclined axes and transmits the necessary power to the blades in their respective planes of rotation. Simultaneously the guiding hub member 154 also applies a torque to the frame member 152 about a vertical axis with the result that power is transmitted to the frame member about the vertical axis in addition to the power which is transmitted through the wobbling motion to the blades. The power transmitted to the said frame member through the "wobbling" motion imparted to it is proportional to the difference between its speed of rotation and that of the guiding hub member 154, while the power transmitted about the vertical axis is directly proportional to the rotational speed of the frame member 152 of the hub 160. Since the frame member 152 rotates at half the speed of the guiding hub member 154 the power transmitted to the frame member 152 about the vertical axis is equal to the power transmitted through the "wobbling" motion and which is then transmitted by the frame member to the blades rotating about their inclined axes.

Since power directly applied to the blades around a vertical axis will produce a corresponding reaction in the stationary system it is necessary either to convert the power into rotary power about an inclined axis by the use of suitable guide means before transmitting it to the blades, or to provide other means forming the necessary link between the blades and the stationary parts of the system in order to transmit to the latter the anti-reaction-torque action generated by the blades. Such a means is formed by the gear 125 which is preferably of the planetary type with a ratio of 2:1 which couples the shaft 120 with the shaft 121 the non-rotating parts of which are fixed to the stationary parts of the system.

In order to convert the rotary power transmitted by the vertical shaft into rotary power around inclined axes two guide means mounted on the shaft 121 and practically identical with the guide means 93, 104 and 94, 107 illustrated in Figure 9A may be used. Such a modification would merely form a combination of the two modifications illustrated in Figure 9A and in Figure 13. In such a modification the gear 125 would not be necessary but it is preferable to use a gear for the reasons stated below.

In fact the use of the gear constitutes a simplification and has the additional advantage that the rotor system can be operated either to produce the anti-reaction torque, as above described, or to operate the helicopter as a conventional helicopter in which latter case all the power would be transmitted from the shaft 120 to the shaft 121 through the gear 125 while the hub assumes a neutral position. A rudder 13 as previously mentioned and shown in Figure 4, would in this case counteract the reaction of the rotor. The gear 125 in such a case does not constitute an added gear but forms the last member of the regular reduction gear required for the normal operation of the helicopter. The anti-torque system according to this invention will therefore only be used in hovering or flying at low speeds, while at higher speeds after a gradual transition from one condition to the other the system will operate in the conventional manner.

When slowing down the reverse gradual transition from one condition to the other again brings the anti-torque system according to the invention into action.

It will be noted that, as has been explained above in connection with other modifications, all forces acting on hub member 154 are balanced with respect to the axes of the trunnions 156 if the cyclic lift variations are properly phased. Therefore no further links are required to couple the hub member to the trunnion support member which is coupled with the shaft. The hub member is therefore completely free to assume any inclination which may be determined by the blade system. The blade system on the other hand is controlled by the cyclic pitch control system.

It follows that the various operations of the system are therefore entirely controllable by controlling the pitch control system as has been explained above.

As has been previously explained the same construction, in which however the gear members of the gear 125 connecting the two shafts are omitted, may be used for a simplified construction which has advantages with respect to weight and simplicity of operation over the conventional helicopter as well as over some constructions of the improved helicopter according to the invention. This simplified version may also be considered as being illustrated in Figures 13–17 if in Figure 13 this gear 125 is removed and if the lowermost portion of the shaft (not shown in Figures 14–17) is provided with the construction illustrated in Figure 19.

This figure shows a simplified means for coupling the two shafts 120, 121 during the starting phase in which no power is transmitted, but in which the blades of the rotor are only brought to a speed sufficient to make the pitch control operative. This starter clutch or coupling consists of a cylindrical friction disk 281 keyed to the shaft 120 and of a second coaxial cylindrical friction disk 282 which is fixed to or integral with the shaft 121. The two friction disks and their shafts are not coupled during normal operation of the helicopter under power. However, the disks may be coupled during the starting phase by means of a friction roller 284 which is pressed against their rims. Means for pressing the coupling friction roller 284 against the circumferential portion of the disks are indicated diagrammatically in Figure 20, where they are shown to consist of a hand lever 285 operated by the pilot which is normally drawn away from the shafts 120, 121 by the spring 286. The hand lever has a cylindrical portion 287 forming an axle around which the friction roller 284 may rotate. The hand lever is fulcrumed at 288. A forward movement of the lever 285 towards shafts 120, 121, against spring pressure will bring the friction roller into frictional contact with both cylindrical friction disks 281, 282 and will thus couple the shafts, so that the drive shaft may transmit movement to the blades to the necessary extent in order to make the pitch control operative.

In order to understand the operation reference may be made to the description of the operation of the drive and control mechanism, as illustrated, when equipped with the gear mechanism 125.

It has been explained that with such a mechanism power is applied by the drive shaft 120 to the guiding or inner hub member 154 at twice the speed of rotation of the blade system. One half of the power is transmitted to the guided or frame member 152 through the "wobbling" motion and is then transmittted to the blades through their flapping motion, the blades producing a forward propelling action about the vertical axis proportional to said power. The other half of the power applied by shaft 120 is transmitted to the frame member 152 and then transmitted to the blades directly as a torque about the vertical axis. Such a torque directly applied to the blades produces a reaction torque, which acts on the stationary parts of the system. The generation of such a reaction torque is avoided, according to the construction shown in Figure 13, by returning the power applied to the frame member 152 about the vertical axis back to the drive shaft 120 through the gear 125 and transmitting to the blades only the power applied to frame member 152 through the "wobbling" motion.

For the simplified arrangement now described, in which gear 125 has been eliminated, the power is not returned to the drive shaft and consequently one-half of the power is applied to the blades through their vertical components of motion, through the "wobbling" motion of the hub, which produces a forward propelling action, but the other half of the power is applied directly to the blades as a torque about the vertical axis. This produces a corresponding reaction torque which is obviously equal to one-half of the reaction torque that would be produced if the total power were applied as a torque about the vertical axis, as in a conventional helicopter.

To counteract said reaction torque any means utilized in or suggested for conventional helicopters may be used. Some of the methods which cause difficulties, consume power or produce complications of structure when the total reaction torque has to be counteracted, become simple and much more effective if only a much reduced reaction torque has to be counteracted. Some of these methods are illustrated.

Figure 25 illustrates one of the means for counteracting the reaction torque which consists in a tail propeller 293 mounted near the end of the tail 292 of the helicopter 290. Such a propeller of reduced size is quite easily mounted on the tail.

According to the construction shown in Figure 26 a jet device 295 is used, the reaction of which counteracts the reaction torque. Again the jet device counteracting the reduced torque is sufficiently small and simple and permits to avoid the complications connected with a large jet device.

A device which produces an unusual simplification is the device illustrated in Figure 21 to Figure 24. This device is based on the principle of catching and acting on the downwash of the rotor, deflecting the air stream in one direction thus counteracting the reaction torque.

This method, although theoretically known, and apparently attractive on account of its mechanical simplicity could not be successfully introduced because in order to counteract the reaction torque practically the entire downwash must be deflected in order to produce an effective counter-reaction-torque. This results in an extremely bulky and cumbersome structure.

However, with the modification of the invention described in which power is applied at twice the speed of the rotor, only one-half of the reaction torque has to be taken up and therefore the area covered by the deflecting means is theoretically only one-half of the area which would otherwise be necessary and is less in practice because it is now possible to select the portions of the downwash which have the highest speed value. Thus only a relatively small portion of the rotor area must be covered by the deflection device to counteract the reduced reaction torque, and to provide ample capacity to turn the helicopter in one direction or the other.

The device as illustrated diagrammatically in Figures 21–24 consists of a number of deflecting airfoils 300 rotatably mounted between arcuate supports 298, 299. Preferably the deflecting structure is so mounted that it will be located below that portion of the rotor which will produce the highest air speed in the downwash. The reaction due to the deflection of this stream counteracts the reaction torque. The airfoils 300 are fulcrumed on the supports on bars or rods 301 and are attached to a rod 302 which may be moved by a suitable mechanism such as indicated at 303 which consists of a cable train running over rollers which is moved by a hand lever 304 operated by the pilot.

With respect to the operation of the device it will be noted that, since no gear is used to couple the coaxial shafts 120 and 121, when the blades are made to rotate in a common horizontal plane by adjusting the pitch control accordingly, the hub member 160 and consequently the inner or guiding member 154 will also rotate in a horizontal plane. The hub member rotates freely within the frame member 152 and does not act on the hub member 160. No power will be transmitted to the blades. But if the pitch control system is adjusted so that one of the two pairs of diametrically opposite blades is made to rotate in a plane inclined in a direction opposite to the direction in which the plane of rotation of the other pair of blades is inclined, the outer member 152 will perform a "wobbling" motion in the direction of its rotation at a frequency double to that of said rotation, as already described in connection with the modification which is provided with the gear. This wobbling motion produces a locking effect between the inner hub member 154 and the outer hub member 152, which couples both members for rotation about the vertical or drive shaft axis. The locking effect is due to the fact that when the wobbling motion starts, the inner hub member, which rotates at a speed double that of the outer hub member, is made to rotate in a constant tilted position relative to the drive shaft and if the inner hub member tends to either increase or decrease said speed it would have to force downwards on one side of the outer hub member and upwards on the opposite side against the action of the blades. If the speed of the inner hub member tends to increase, power is transmitted from the inner to the outer hub member which increases the speed of the outer hub member and blades, thus maintaining the synchronism between both hub members. If the speed of the inner hub member tends to decrease, power is transmitted from the outer to the inner hub member which decreases the speed of the outer hub member and blades, again maintaining the synchronism between both hub members. Since during normal operations power must be constantly transmitted from the inner to the outer hub member, the position of the inner hub member is always slightly advanced with respect to the outer hub member so that the inner hub member is always forcing the outer hub member and blades up on one side and down on the opposite side and thus transmitting power to said blades through their reciprocating or flapping components of motion, while at the same time a torque is applied to the hub and blades about the vertical or drive shaft axis. The correct advanced position of the inner hub member relative to the outer hub member is assumed automatically, depending on the power transmitted, and needs no adjusting action by the pilot.

To start the operation the stepped friction clutch roller 284 is coupled with the two disks 281 and 282 and the pitch control system is adjusted to rotate the blades in moderately inclined planes and the speed of the shaft 120 is increased until it has a speed which is twice that of the hub and blades. The normal "wobbling" motion will then start which produces a "locking" effect between the inner and outer hub members enabling the former to transmit power to the latter and to the blades, both as a torque about the vertical axis and through their vertical components of motion. The inclination of the planes of rotation of the blades is then increased until the required power is transmitted to the blades.

The downwash from the outer sector of the rotor which has the greatest speed is driven into the deflector and counteracts the reaction torque as above described.

For turning the helicopter in the direction in which the torque acts the greatest amount of deflection will be necessary in order to overcome the reaction torque. To turn the helicopter in the other direction the reaction torque may be used by reducing the deflection.

The modifictions so far described are a complete system and in the following an example of the pitch control will be described which example may be used in connection with any one of the modifications described but which is shown here only as applied to the modification illustrated in Figures 13 to 19 because this system has no guide means under the hub complicating the showing of this control.

As shown in Figures 13 and 14 the pitch of each blade is controlled in the well known manner which has been described in connection with other modifications by means of the pitch adjustment arm 36 attached to the arm 34 and by means of the pitch control rods or links. The arms 36 are joined within the openings or bores 195 made in the bosses of the member 152 and by suitable universal joints, to pitch control rods, designated in the figure by the reference numerals 37a, 37b, 37c, 37d. It will be noted that the bores through which the pitch control arms pass are made in one of the bosses which is 90° apart from the boss carrying the blade controlled by the said arms. The pitch control rods are fixed by means of universal joints to the swash plates designated generally by 201, 202 and each of which consists of an annular rotating plate member 204 and 205 respectively, the marginal portion of which is embedded within a stationary U-shaped annular guide frame member 206, 207 respectively. Each annular plate member 204, 205 is carried by a gimbal ring 208, 209 respectively, carrying swivel pins 210, 211 respectively, projecting into bearing recesses of said plate members. The gimbal rings are supported on trunnions 212, 213 respectively which project from a sleeve 215, 216 respectively which is slidably mounted on shaft 121 but which is coupled for rotation with the said shaft by means of a pin 217 and 218 respectively entering the groove or slot 220, 221 respectively in the sleeve.

The ends of the pitch control rods 37a and 37c are fixed by means of universal joints to the inner member 204 of the upper swash plate, while the two pitch control rods 37b and 37d are similarly fixed to the inner member 205 of the lower swash plate, the fixation point being located on the same diameter but on opposite sides of the axis of rotation.

The swash plates are tilted by means of forked bosses or projections 219 projecting from said stationary outer annular members 206, 207, the bosses projecting from member 206 being not shown in the drawing. Each forked projection carries a pivot joined by means of a universal joint to the head of a swash plate link 222, 224 respectively, two of said adjusting links located at diametrically opposite points directing one swash plate in one direction. Each adjusting link is connected by means of a universal joint to the head of one of the swash plate position control units 240, 241, . . . . Each unit consists of five concentric tubes 230, 231, 232, 233, 234 threaded on the outside and the inside and of a concentric threaded stem 235 which carries the head 236 to which the lower ends of the adjusting links 222, 224 are attached. The pitch of the threads on the inside and outside of the tubular members may differ and preferably some members have a right hand thread on one side and a left hand thread on the other side. Each tubular member in the stem is provided with a pulley 244, 245, 246, 247, 248. It is obvious that a rotation of one of the pulleys or a plurality of pulleys produces a differential movement of the head 236 the extent of which depends on the pitch of the threads of the tubular members, on the number of tubular members moved, and on the direction of movement.

The outer threads of the outermost tubular member 230 engage corresponding threads on a stationary board 250.

While five different pulleys are necessary in the modification provided with the gear 125 connecting the shafts 120, 121, illustrated in Figure 13, the modification without such a gear, as shown in Figure 19, needs only four different adjustments by means of pulleys which will accomplish the same result.

As seen in Figure 13 there are eight swash plate condition control units, four for each swash plate arranged in pairs, each pair controlling the movement of one of the swash plates in one direction.

For moving the units a gear transmission or driving cables may be used, the latter method being illustrated. To facilitate control a single control lever or control stick 260 (Figure 3) is provided for each of the five types of control to be achieved. The stick 260 is fixed to a disk 252 which is mounted for all-around motion by means of a ball joint 254. On said disk the driving cables 255 are fixed, the ends of each cable 255 being attached to diametrically opposite points 251 of the disk 252. The cables are tensioned and guided by means of suitable rollers 256 so as to run around the pulleys of cooperating units. It will be noted that on each disk 252 a cable 255 for each pair of diametrically opposite units is provided so that the movement of the stick 260 in a direction coincident with the diameter joining the cable fixation points 251 rotates cooperating pulleys, for instance 244, while a movement of the stick at right angles thereto does not affect the cables and the pulleys. Movement of the stick in intermediate directions therefore rotate the pulleys to a less degree than the first named movement. Moreover it will be clear that the direction of the rotational movement corresponds to and changes with the direction of movement of the stick 260.

As indicated in Figure 3 a cable is attached to the disk 252 for each pair of diametrically opposite swash plate position adjusting units 240, 241 . . . 262, so that each disk moves the eight ends of four cables by means of the stick 260. The pulleys moved on each of the units by one of the disks 252 are those which correspond to the same tubular members of the series. For each of the five pulleys 244, 245, 246, 247, 248 of the unit separate disks 252 and a separate stick 260 has to be arranged. The entire control of the helicopter in this case therefore requires the manipulation of these five controls.

The theoretical introduction to the description of the invention will have made it clear that all forces are automatically balanced by properly adjusting and phasing the lift variations. The main feature of the invention therefore consists in the fact that the system, as described above, is one in which all operations are automatically controlled through the control of the pitch control system. This also permits the helicopter to fly as a conventional helicopter. For, if the cyclic pitch control is brought to its neutral position all the blades rotate in a common plane and the cams will be in a neutral position. In this case no anti-reaction-torque is produced.

The principle of the invention, as will be readily understood, may be applied in many different ways and the replacement of the unessential parts of the system by mechanisms of a different type will therefore not affect the essence of the invention as defined in the annexed claims.

Having described the invention what is claimed as new is:

1. A drive and control system for helicopters provided with a fuselage, a drive shaft, and a plurality of blades mounted for rotation around the axis of said drive shaft by means of lag hinges, comprising means producing a controllable anti-reaction torque, said means including a pitch control system moving each blade around its longitudinal axis into a predetermined position, provided with means for cyclically varying the pitch of the blades, said pitch control system, in cooperation with the driving means, being operative to produce rotation of each blade about an axis inclined relatively to the drive shaft axis and to vary the angle of inclination of said inclined axis of rotation of said blades, means for transmitting power from the drive shaft to each blade to rotate the same about said inclined axis of rotation, said last named means including guide means with a guiding and a guided member, slidable relatively to each other, but coupled for an angular motion relatively to the drive shaft axis, means for coupling one of the members of said guide means to the drive shaft, means for operatively connecting the other member of the guide means to the fuselage, said connecting means and said last named coupling means including pivotal connections for free angular motion of the members of the guide means about axes substantially perpendicular to the drive shaft axis, and further means for coupling one of the members of the guide means to the blades, the connecting means transmitting an anti-reaction torque to the fuselage, while the last named coupling means transmits power from the guide means to the blades, thus rotating the latter about their inclined axis of rotation, the blades through the last named coupling means simultaneously controlling the angular position of the guide means, which angular position is determined by the pitch control system.

2. A drive and control system for helicopters, provided with a fuselage assembly, with driving means including a drive shaft and with a plurality of blades mounted for rotation around the axis of said drive shaft by means of lag hinges, comprising a pitch control system equipped with means for cyclically varying the pitch of the blades adapted to produce, in cooperation with the driving means, the rotation of each blade around an axis inclined with respect to the drive shaft, said means for cyclically varying the pitch being adapted to vary the inclination of the inclined axis relatively to the drive shaft, means for transmitting power from the drive shaft to each blade, including a guide means with a guiding and a guided member, means for controlling the angular position of the guide means relatively to the drive shaft axis by means of the blades, and for transmitting power from the guide means to the blades, and means for operatively connecting said guide means to the fuselage assembly.

3. A drive and control system as claimed in claim 2, wherein the guiding and guided means are coupled with each other for an angular movement relatively to the drive shaft axis but are rotationally slidable relatively to each other.

4. A drive and control system as claimed in claim 2, wherein said means for transmitting power include means for coupling said guided member with the drive shaft and with the blades, means for operatively connecting said guiding member with the fuselage, the last named means and the coupling means between said guided member and the drive shaft including pivotal connections for free angular motion of the guiding and guided members respectively about axes at right angles to the drive shaft.

5. A drive and control system as claimed in claim 2, wherein the blades are attached to a hub means, and wherein the means for transmitting power are inserted between the drive shaft and said hub means and include a rotational hub member pivoted to the drive shaft for universal angular movement relative to the drive shaft, the guided member being pivoted to the drive shaft for converting the torque about the drive shaft axis into a torque about an axis inclined thereto, while the guiding member for the said guided member is operatively connected with the fuselage and guides the angular movement of the said guided member relatively to the drive shaft axis, the pitch adjustment of the blades thus determining the position of the hub means and of the guided and guiding member, and thus reacting on the fuselage through the last named member, counteracting the reaction torque on the fuselage.

6. A drive and control system for helicopters as claimed in claim 2 in which the plurality of blades is attached to a rotor provided with a hub means, wherein the hub means includes members pivoted to the drive shaft and to each other by pivots at right angles to each other, coupling said drive shaft with said blades, and wherein said guiding member engages said guided member and moves it angularly relatively to the drive shaft axis, but is rotationally movable relatively to said guided member and wherein means for connecting said guided member to the hub means are provided for transmitting reciprocating motion from said guided member to said hub means thus producing counterbalancing between the reaction torque and the anti-reaction torque by self-adjustment of the rotor relatively to the axis of the drive shaft, in response to the combined pitch adjustment of the blades.

7. A drive and control system for helicopters as claimed in claim 2, wherein the plurality of blades is attached to a rotor with hub means and wherein the power transmitting means further includes a rotating member driven by the drive shaft and pivoted to the same and wherein the guide means include hub guides formed by the guided members driven by the drive shaft and by the guiding members engaging said guided members for angular movement relatively to the drive shaft axis, but rotationally slidable relatively to each other, said guiding and guided members being inclinable with respect to the drive shaft, means connecting said guided members to said hub means for transmitting reciprocating motion to the latter, and means for linking said guiding members with the fuselage thus producing a counterbalancing of the influence of the reaction torque by an adjustment of the rotor relatively to the axis of the drive shaft responsive to the pitch adjustment of the blades.

8. A drive and control system for helicopters as claimed in claim 2 in which the plurality of blades is attached to a rotor with hub means, and wherein the cyclic pitch variation means is adapted to produce, in conjunction with the driving means, a rotation of a blade around an axis inclined with respect to the axis of rotation of another blade and wherein a gimbal ring is provided pivotally connected with the drive shaft and the hub means by pivots at right angles to each other, and wherein the means for transmitting power from the drive shaft to each blade include the hub means, and further include guided means mounted on the drive shaft by means of pivots and guiding means connected with the fuselage engaging said guided means and movable relatively to said guided means, said guided means and guiding means being inclinable with respect to the drive shaft and wherein means connecting said guided means to the hub means are provided for transmitting reciprocating motion from said guided means to said hub means, whereby an adjustment of the rotor relative to the axis of the drive shaft responsive to the pitch adjustment of the blade and an exact counterbalancing of the influencing of the reaction torque is produced.

9. A drive and control system for helicopters as claimed in claim 2, wherein the plurality of blades is attached to a rotor with a plurality of hub members, and wherein the means for producing cyclic pitch variations produce, in conjunction with the drive means, a rotation of a blade attached to one of the hub members around an axis inclined with respect to the axis of the drive shaft, and a rotation of a blade attached to a further hub member around an axis inclined with respect to the drive shaft and with respect to the axis of rotation of the blade attached to the first named hub member and wherein means are provided for mounting said hub members on the drive shaft for universal motion and wherein the means for transmitting power to said blades include guided members mounted on said drive shaft for universal motion, connecting means between each of said hub members and one of said guided members holding said hub member and guided member in substantial parallelism and guiding members for each of said guided members connected with the fuselage, the action of the pitch control and the action of the fuselage on the guided members producing an adjustment counterbalancing the reaction acting on the fuselage.

10. A helicopter comprising a fuselage, a rotor including a hub assembly consisting of a plurality of members, including a guiding and a guided member rotationally slidable relatively to each other, a plurality of blades attached to the hub assembly, means for producing cyclic pitch variations of said blades, a plurality of coaxial drive shafts, rotating at different speeds, one of the drive shafts being operatively connected with the fuselage, means for transmitting power between each of said drive shafts and the respective one of the rotationally relatively slidable hub assembly members, said last named means including means for supporting each of said hub assembly members, each of said hub assembly supporting members being connected for universal motion with one of the two drive shafts respectively, one of the coaxial drive shafts transmitting power to the guiding member, while power is transmitted from the guided member to the other drive shaft which is connected with the fuselage.

11. A helicopter as claimed in claim 10, comprising in addition a vane pivotally attached to the drive shaft having the higher speed of rotation, and means linking said vane with one of the means for transmitting power from said last named drive shaft to the respective one of the rotationally slidable hub members of the hub member assembly.

12. A helicopter as claimed in claim 10, comprising in addition, gear means between the coaxial drive shafts for maintaining a definite speed ratio between them.

13. A helicopter as claimed in claim 10 wherein the hub member assembly consists of an outer hub member, provided with pivots supporting a transverse member pivoted in its turn to one of the drive shafts, and an inner hub member pivoted to a second transverse member which in its turn is pivoted to the other drive shaft.

14. A drive and control system for helicopters comprising a plurality of coaxial drive shafts, gear means between said drive shafts, to rotate said drive shafts at different speed, a rotor including a hub member assembly and a plurality of blades, the hub member assembly including a guiding and a guided member, rotationally slidable with respect to each other, the guiding member and guided member being coupled with each other for an angular movement relatively to the common drive shaft axis, a transverse trunnion support carrying trunnions to which the guiding member is attached, said trunnion support being supported by the shaft having the higher speed by means of trunnions the axes of which are at right angles to the axis of the trunnions carrying the guiding member, a transverse member carrying further trunnions supporting the guided member, said transverse member being supported on the shaft operated at a lower speed by a still further set of trunnions arranged at right angles to the last named trunnions supporting the guided member, a plurality of blades attached to the hub assembly and coupled wth the guided member of said assembly by coupling means for rotational movement around their longitudinal axis, and by coupling means for universal motion, a pitch adjusting means including means for cyclically varying the pitch adapted to produce a rotation of each blade around an axis inclined with respect to the common axis of the coaxial drive shafts, the rotation of different blades produced by the cyclic pitch variation being produced around axes inclined toward each other, the blades through their coupling means with the guided hub assembly member controlling the angular position of the guided and guiding member of the hub member assembly, which angular position is controlled by the aforesaid cyclic pitch adjusting means thus producing a self adjustment of the rotor relatively to the common axis of the drive shaft and a counter-balancing of the reaction torque and anti-reaction torque.

15. A drive and control system as claimed in claim 14, wherein the cycle pitch control comprises adjustable swash plates movable in a plurality of directions, pitch control levers attached to said swash plates and to the blades and means for applying a differential control adjusting the swash plates, including a plurality of members moved independently, the differential movement of which is imparted to the swash plates, and manual controls for each of said members.

16. A helicopter comprising a fuselage and a plurality of blades, means to transmit power to the blades including a plurality of coaxial shafts, a hub assembly to which the blades are attached, including a guiding and a guided member rotationally slidable relatively to each other, a plurality of pitch controlling means for producing cyclic pitch variations of said blades, different pitch controlling means producing cyclic pitch variations of different blades, so that a blade controlled by one of said pitch controlling means rotates in a plane different from the plane in which a blade controlled by another pitch controlling means rotates, means for connecting each of said rotationally relatively slidable members for universal motion with one of the drive shafts, one of said coaxial shafts transmitting power to said guiding member.

17. A helicopter comprising a fuselage and a plurality of blades, means to transmit power to the blades including a plurality of coaxial drive shafts, a hub assembly to which the blades are attached, including a guiding and a guided member rotationally slidable relatively to each other, means for producing cyclic pitch variations of said blades, means for connecting each of said rotationally relatively slidable members for universal motion with one of the drive shafts, a vane pivotally attached to one of the drive shafts, and means linking said vane with the means for connecting the respective rotationally relatively slidable members for universal motion to the shaft to which the vane is attached, one of said coaxial drive shafts transmitting power to said guiding member.

18. A drive and control system for helicopters, provided with a fuselage assembly, with driving means including a drive shaft, and with a plurality of blades mounted for rotation about the axis of the drive shaft, comprising means for transmitting power from the drive shaft to each blade including a guide means and means for transmitting power from the guide means to the blades, means for cyclically varying the pitch of the blades including a plurality of tiltable swash plates, different swash plates cyclically varying the pitch of different blades and controlling means operative to tilt different swash plates in different directions whereby a blade whose pitch is controlled by one swash plate will be made to rotate about an axis inclined relatively to the axis about which a blade whose pitch is controlled by another swash plate rotates.

19. A starting assembly for helicopters as claimed in in claim 16, wherein the plurality of coaxial shafts are unconnected, each shaft carrying a member of a friction clutch, and a manually controlled frictional member adapted to engage said friction clutch members for temporary connection between the shafts for starting the rotation of the blades.

20. A helicopter comprising a fuselage and a plurality of blades, means to transmit power to the blades including a plurality of coaxial drive shafts, a hub assembly to which the blades are attached including a guiding and a guided member rotationally slidable relatively to each other, means for connecting each of said rotationally relatively slidable members for universal motion with one of the drive shafts, means for producing cyclic pitch variations of the blades to rotate them in planes inclined relatively to the axis of the drive shaft, whereby part of the power is transmitted from the guided member to the blades as a torque about the axis of the drive shaft while the rest of the power is transmitted by said guided member to the blades in the form of reciprocating vertical impulses, means for counteracting the reaction torque produced by applying power to the blades as a torque about the drive shaft axis and means for counteracting the vibratory reactions produced in applying power to the blades in the form of reciprocating vertical impulses.

21. A helicopter comprising a fuselage and a single rotor provided with two pairs of opposite blades, means to transmit power to the blades including two coaxial drive shafts, a hub assembly to which the blades are attached including a guiding and a guided member rotationally slidable relatively to each other, means for connecting each of said members for universal motion with one of the drive shafts, two pitch controlling means for producing cyclic pitch variations of said blades, each of said means cyclically varying the pitch of one pair of opposite blades whereby the two pairs of blades are made to rotate about axes inclined relatively to each other, thus producing a wobbling motion of the hub assembly, with the result that part of the power is transmitted to the blades as a torque about the axis of the drive shaft while the rest of the power is transmitted in the form of reciprocating vertical impulses, means for counteracting the reaction torque produced in applying power to the blades as a torque about the drive shaft axis and means for counteracting the alternating reactions produced by applying power to the blades in the form of reciprocating vertical impulses.

22. A helicopter comprising a fuselage and a plurality of blades, a hub member to which the blades are attached, a drive shaft rotating at a higher speed than the hub member, means for mounting said hub member on the drive shaft and for transmitting power from the drive shaft to the hub member including a tiltable guiding member pivotally mounted on said drive shaft and a cooperating guided member roationally slidable relatively to the guiding member and fixed to said hub member, and a plurality of pitch controlling means for producing cyclic pitch variations of the blades, different pitch controlling means producing cyclic pitch variations of different blades whereby a blade controlled by one of said pitch controlling means will be made to rotate in a plane different from the plane in which a blade controlled by another pitch controlling means rotates, thereby producing a wobbling motion of the hub member which is communicated to the guide member establishing a coupling action between the guiding and guided members whereby power is transmitted from the guiding member to the guided member partly as a torque about the drive shaft axis and partly in the form of reciprocating vertical impulses.

23. A helicopter as claimed in claim 20 comprising in addition a starting assembly to which the guided member is connected for universal motion, each of said shafts carrying a member of a friction clutch, and a frictional member adapted to engage said friction clutch members for temporary connection between the shafts for starting the rotation of the guided member.

24. The helicopter of claim 10 wherein there are means for coupling said drive shafts.

25. The helicopter of claim 24 wherein said coupling means are gear means.

26. The helicopter of claim 24 wherein said coupling means are a starter to establish a mechanical drive connection between said drive shafts.

27. A drive and control system for helicopters provided with a fuselage assembly, with driving means including a drive shaft and a plurality of blades mounted for rotation about the axis of said drive shaft, comprising a plurality of pitch controlling means equipped with means for cyclic varying the pitch of the blades to produce the rotation of each blade around an axis inclined with respect to the drive shaft, and to vary the inclination of the inclined axis relative to the drive shaft, different pitch control means producing cyclic pitch variations of different blades so that a blade controlled by one of said pitch controlling means rotates in a plane different from the plane in which the blade control by another pitch controlling means rotates, and means including a guide means for transmitting power from the drive shaft to each blade in its inclined plane of rotation.

28. A drive and control system for helicopters provided with a fuselage assembly, with means including a drive shaft, with a plurality of blades mounted on a single hub for rotation about the axis of said drive shaft and with means for mounting the hub for universal angular movement relative to said drive shaft, comprising a plurality of pitch controlling means for cyclically varying the pitch of said blades adapted to produce the rotation of each blade around an axis inclined with respect to the drive shaft and to vary the inclination of the inclined axis relative to the drive shaft, different pitch controlling means producing cyclic pitch variations of different blades, so that a blade controlled by one of said pitch controlling means rotates in a plane different from the plane in which a blade controlled by another pitch controlling means rotates, whereby a wobbling motion of the hub results, and means, including a guide means, for transmitting power from the drive shaft to each blade in its inclined plane of rotation.

29. A drive and control assembly for helicopters, provided with a fuselage assembly, with driving means including a drive shaft, and with a plurality of blades mounted for rotation around the axis of said drive shaft, comprising a plurality of pitch controlling means equipped with means for cyclically varying the pitch of the blades adapted to produce rotation of each blade around an axis inclined with respect to the drive shaft and to vary the inclination of the inclined axis relative to the drive shaft, different pitch controlling means producing cyclic pitch variations of different blades, controlling means for differentially adjusting said pitch controlling means operative to produce rotation of a blade controlled by one of said pitch controlling means about an axis different from the axis about which a blade controlled by another pitch controlling means rotates, and means, including a guide means, for transmitting power from the drive shaft to each blade in its inclined plane of rotation.

References Cited in the file of this patent

UNITED STATES PATENTS

| | | |
|---|---|---|
| 2,404,829 | Darrow | July 30, 1946 |
| 2,420,784 | Larsen | May 20, 1947 |
| 2,444,070 | Stanley | June 29, 1948 |
| 2,490,361 | Kusse et al. | Dec. 6, 1949 |
| 2,575,886 | Myers | Nov. 20, 1951 |